(12) United States Patent
Wada

(10) Patent No.: US 8,724,231 B2
(45) Date of Patent: May 13, 2014

(54) ZOOM LENS AND IMAGE PICKUP APPARATUS EQUIPPED WITH SAME

(71) Applicant: Canon Kabushiki Kaisha, Tokyo (JP)

(72) Inventor: Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/736,536

(22) Filed: Jan. 8, 2013

(65) Prior Publication Data

US 2013/0176479 A1  Jul. 11, 2013

(30) Foreign Application Priority Data

Jan. 11, 2012 (JP) .................................. 2012-003023

(51) Int. Cl.
*G02B 15/14* (2006.01)
(52) U.S. Cl.
USPC .......................................... 359/676; 359/683
(58) Field of Classification Search
USPC ................................. 359/676, 683
See application file for complete search history.

(56) References Cited

U.S. PATENT DOCUMENTS

| 7,692,869 B2 | 4/2010 | Yamaguchi et al. | |
| 2010/0046074 A1* | 2/2010 | Wada | 359/557 |
| 2010/0328783 A1* | 12/2010 | Wada | 359/686 |

FOREIGN PATENT DOCUMENTS

JP  2007279541 A  10/2007

* cited by examiner

*Primary Examiner* — Scott J Sugarman
(74) *Attorney, Agent, or Firm* — Canon USA Inc. IP Division

(57) ABSTRACT

A zoom lens includes a front lens group including a first lens unit and a second lens unit, a reflecting mirror configured to bend an optical path, and a rear lens group including two or more lens units. When the zoom lens is retracted, the reflecting mirror performs at least one of rotation and linear movement to provide space for the front lens group. A focal length of a lens unit having the highest absolute value of refractive power among negative lens units in the front lens group, a focal length of the entire zoom lens at a telephoto end, a maximum value and a minimum value of amounts of movement of the at least two lens units in the rear lens group during zooming, a length of a reflecting surface of the reflecting mirror, and a maximum effective diameter of the first lens unit are appropriately set.

15 Claims, 18 Drawing Sheets

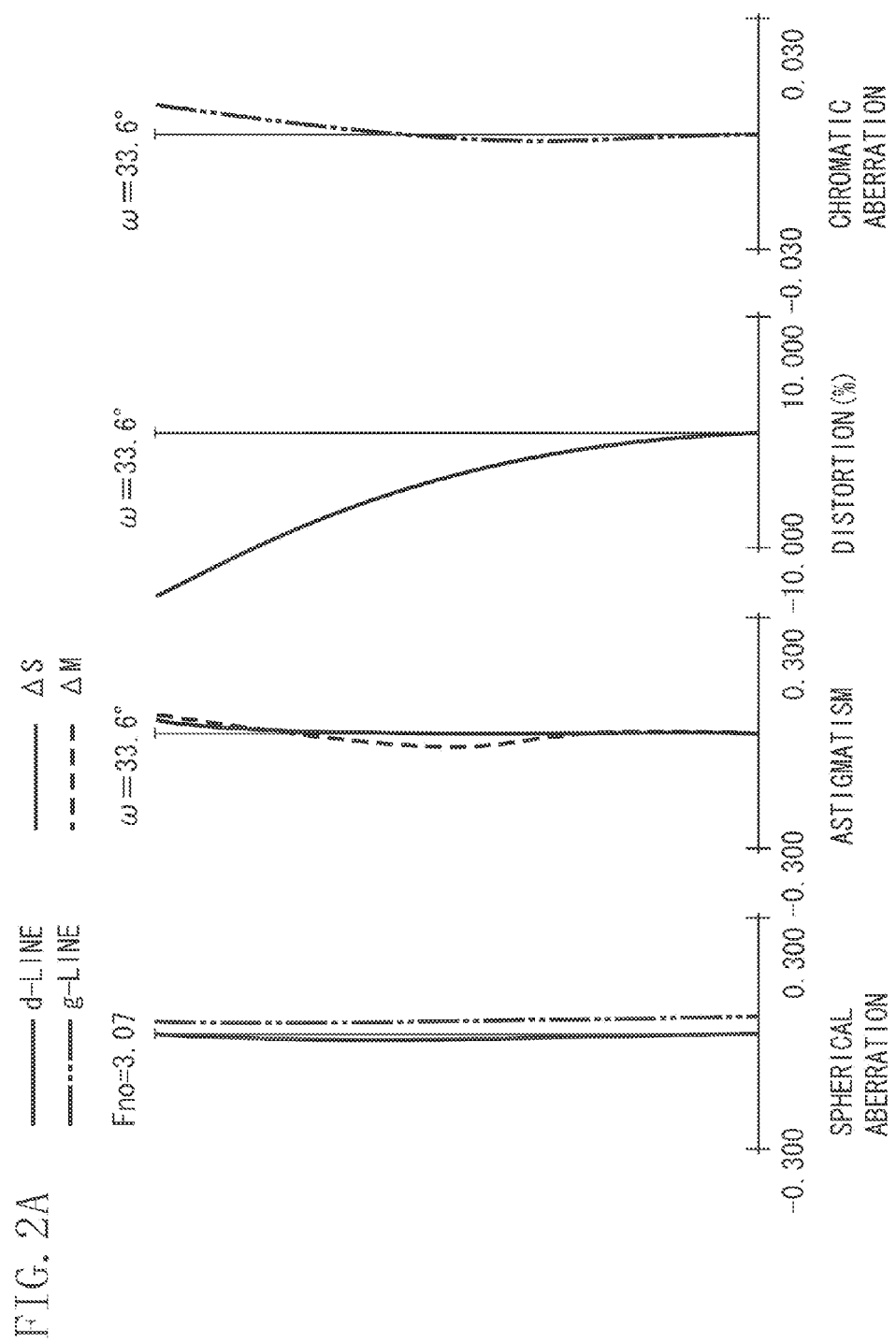

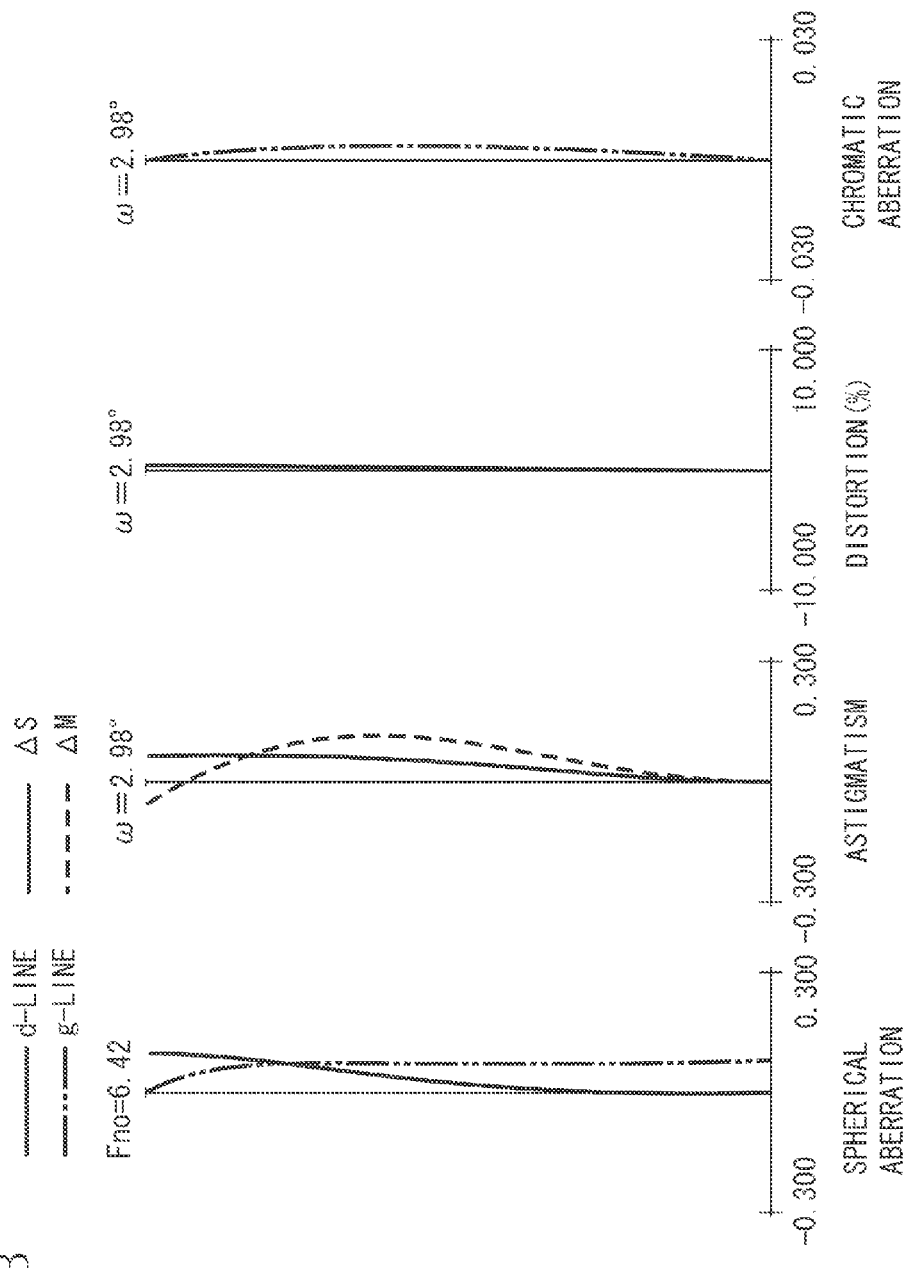

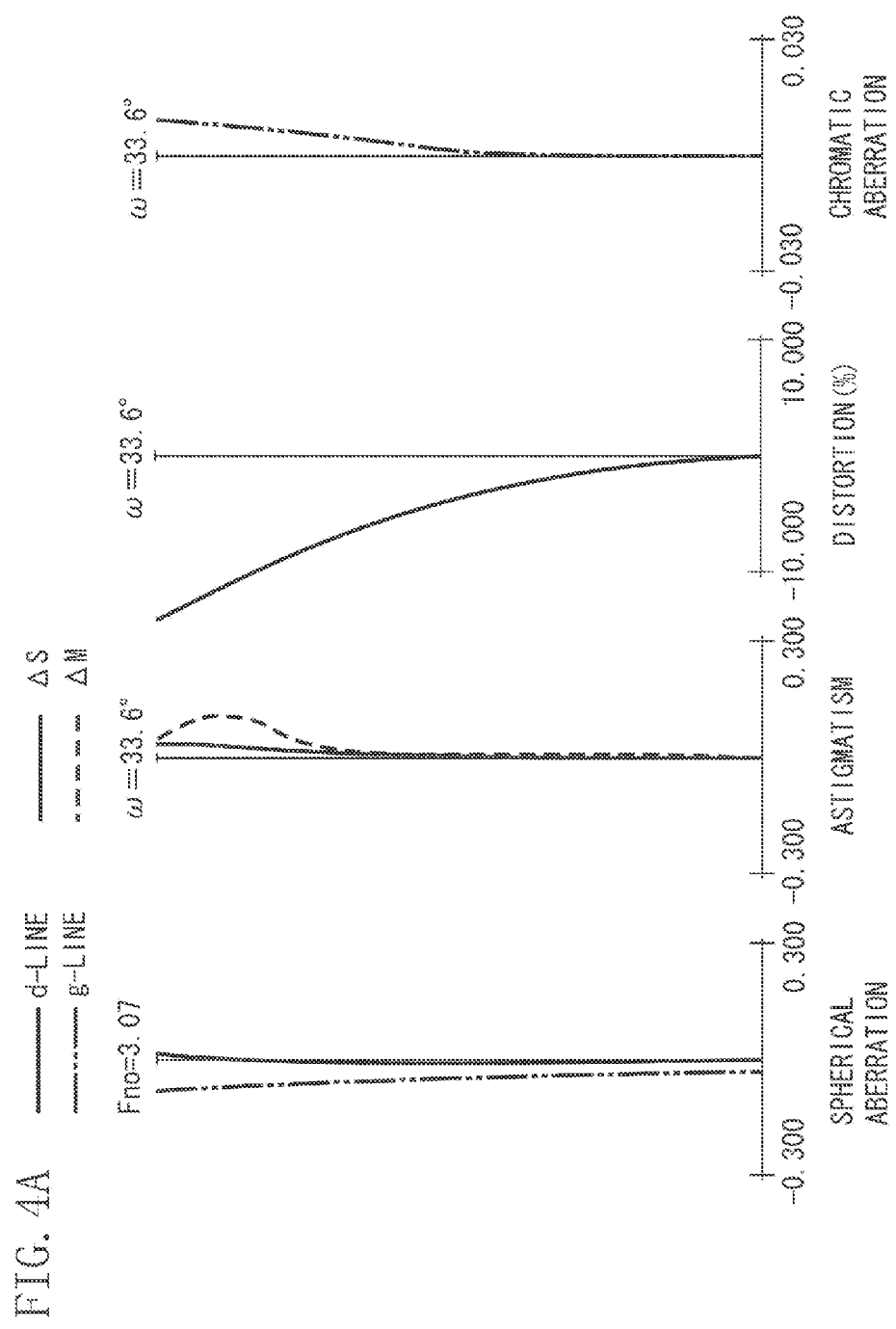

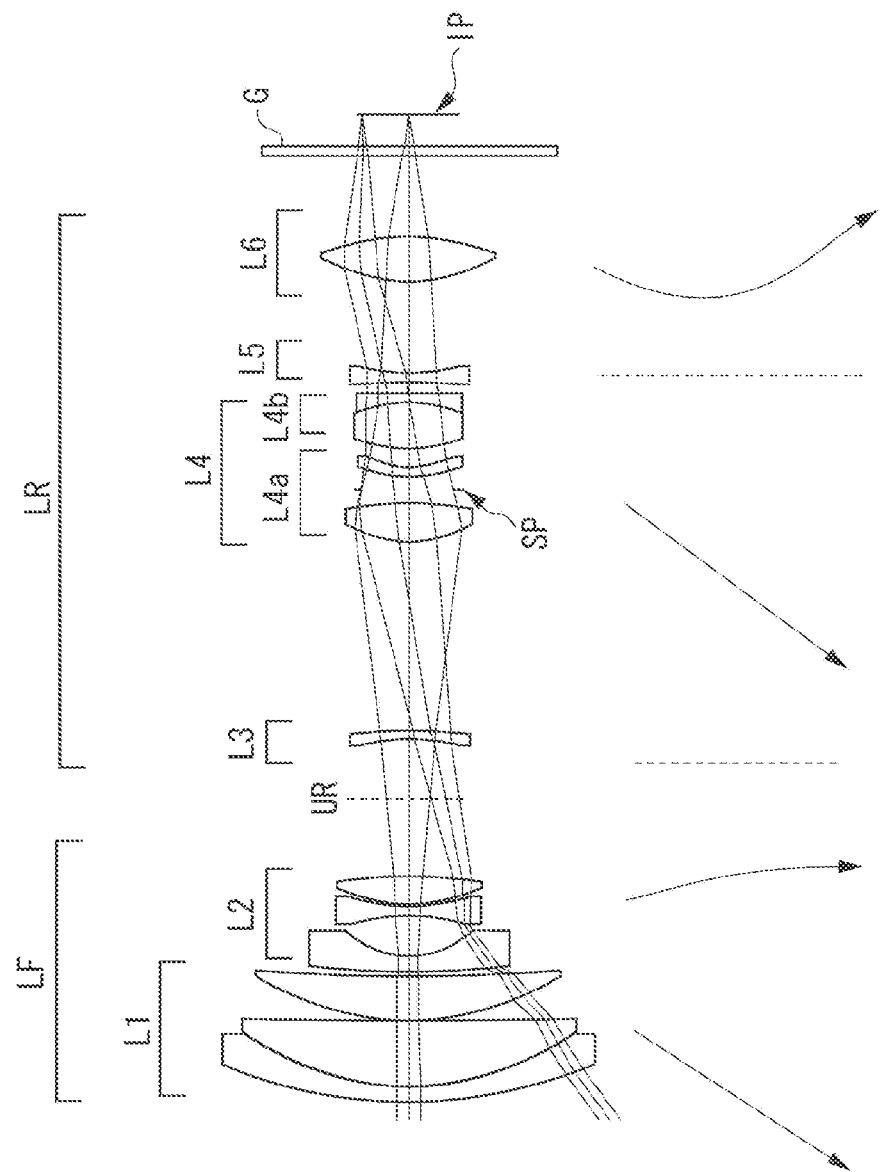

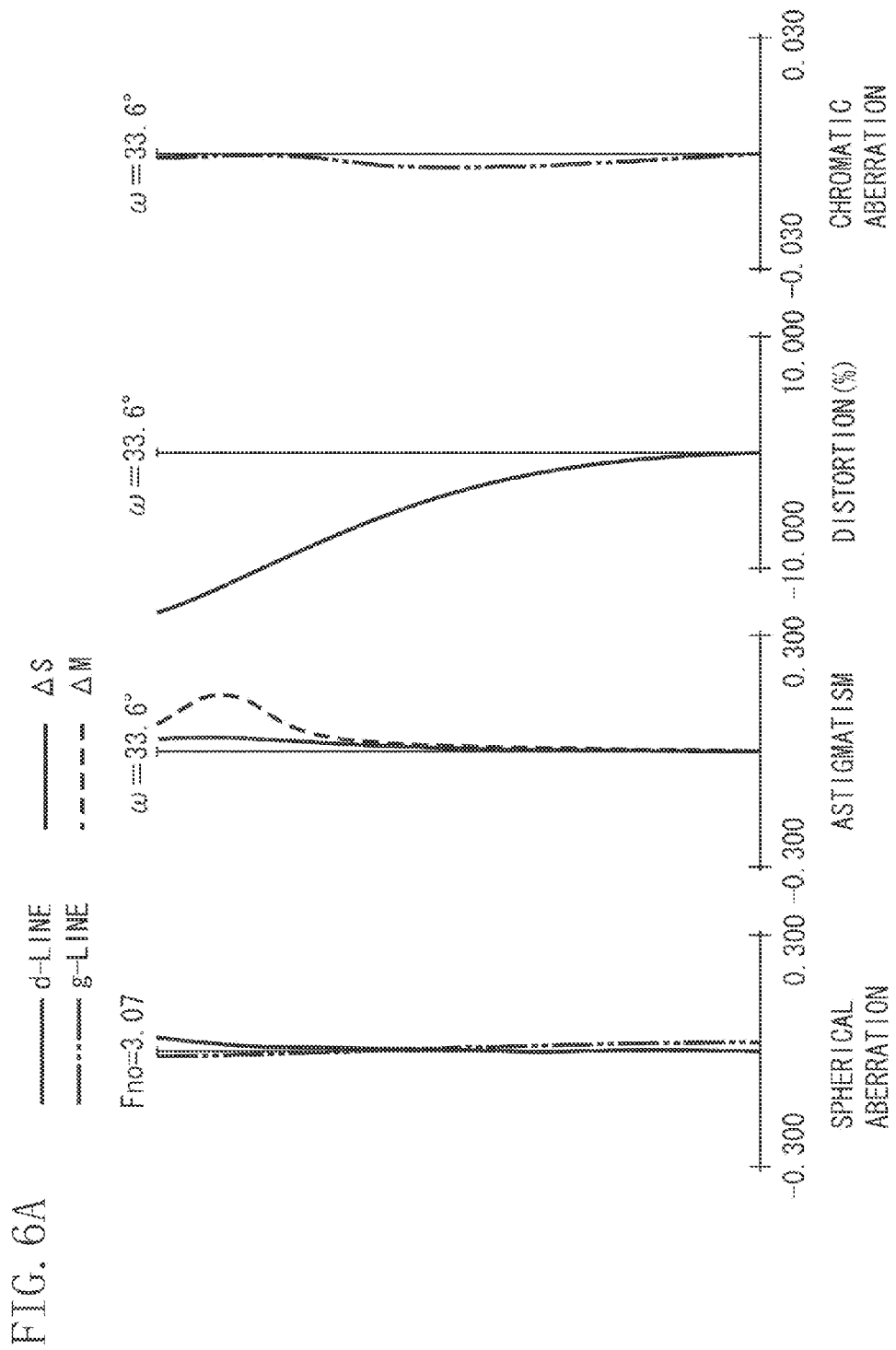

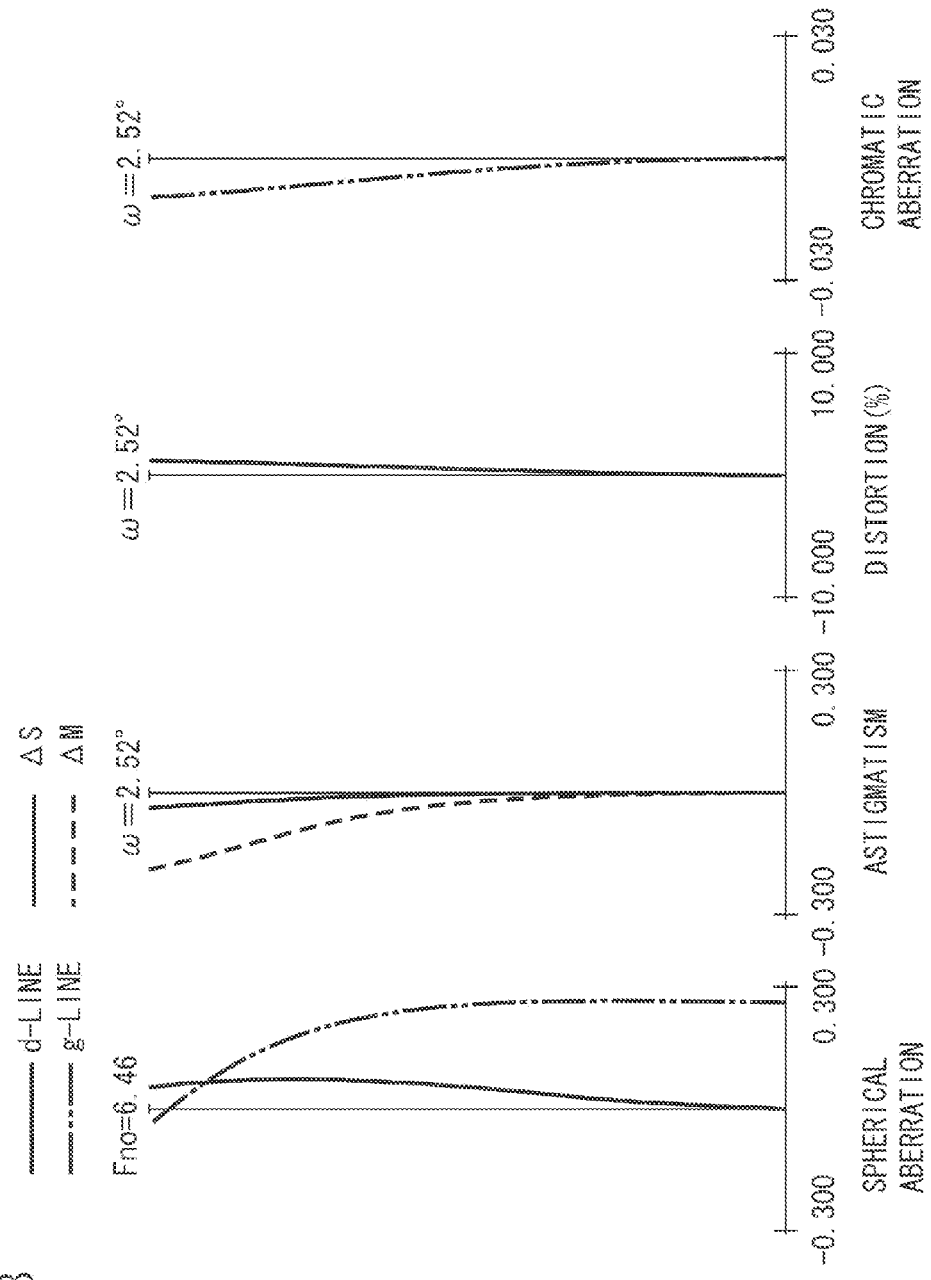

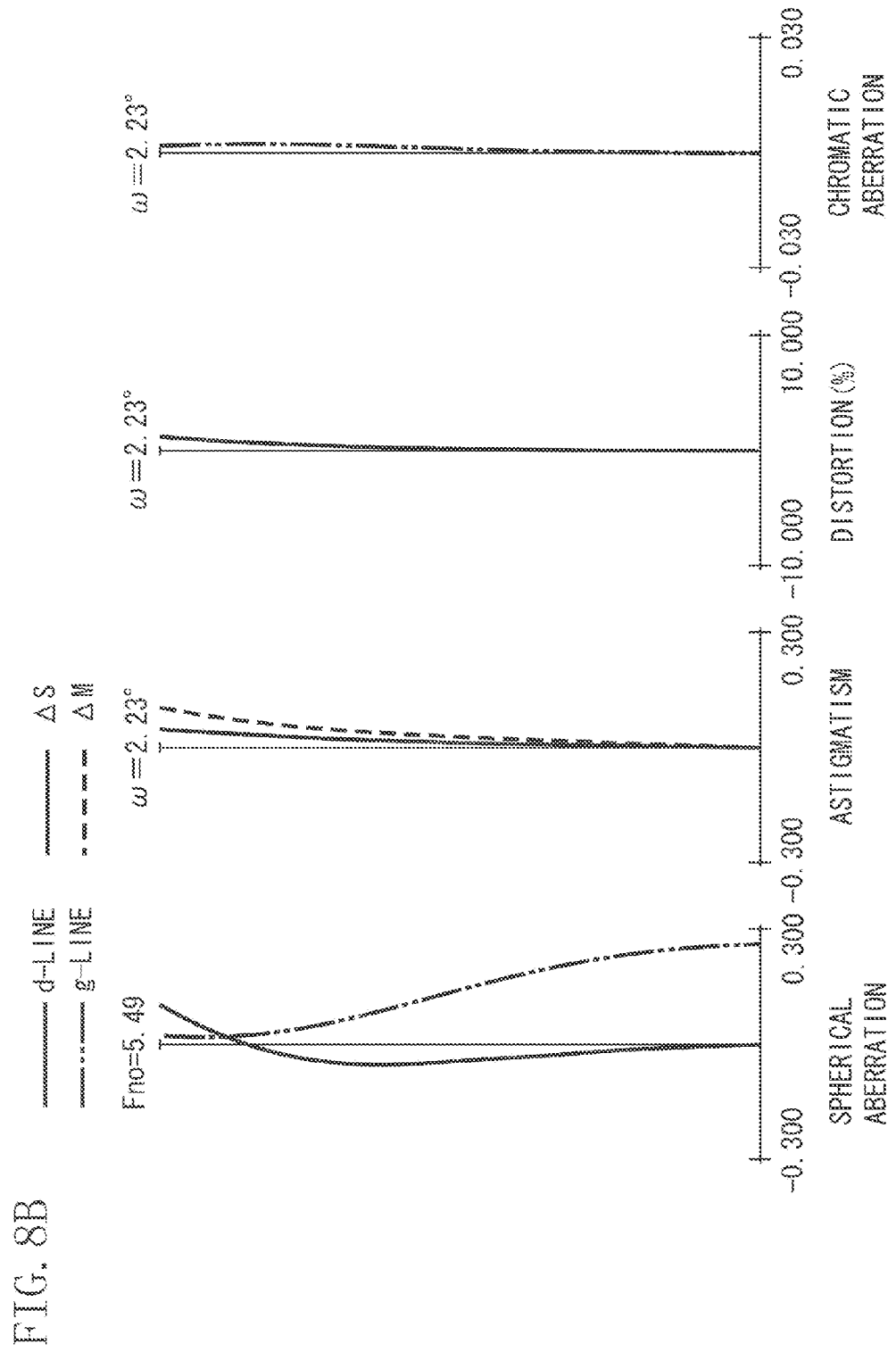

ZOOM LENS AND IMAGE PICKUP APPARATUS EQUIPPED WITH SAME

BACKGROUND OF THE INVENTION

1. Field of the Invention

The present invention relates to a small-size and high-zoom-ratio zoom lens suitable for a digital still camera, a video camera, and the like. In particular, the present invention relates to a zoom lens that facilitates reducing the size of an image pickup apparatus during a non-photographing state.

2. Description of the Related Art

As a photographic optical system used for an image pickup apparatus, there is required a zoom lens that can provide high zoom ratio, small size in the entire body, and a reduced thickness of a camera (thickness in a longitudinal direction).

In order to realize a reduction in size of a camera, conventionally there is known a retractable zoom lens in which a distance between lens units becomes smaller during a non-photographing state than during a photographing state, so that the lens units are stored in a camera body.

Also, in order to reduce a camera thickness, there is known an optical-path-bending zoom lens in which a reflecting member (reflecting mirror) configured to bend an optical axis of a photographic optical system by 90° is arranged on the optical axis.

Also, there is known a zoom lens that bends an optical path using a reflecting member during a photographing state and stores lens units located on the object side of the reflecting member in a space formed by driving the reflecting member during a non-photographing state. For example, see Japanese Patent Application Laid-Open No. 2007-279541 and U.S. Pat. No. 7,692,869.

A retractable zoom lens including a reflecting member configured to bend an optical path of a photographic optical system can obtain a high zoom ratio and reduce a camera thickness when applied to a camera. However, in order to obtain these effects, it is important to appropriately set a lens configuration of a zoom lens and appropriately set an arrangement of a reflecting member on an optical path and a configuration of lens units in front of and behind the reflecting member. For example, it is important to appropriately set the lens configuration, such as the number of lens units, a refractive power arrangement of each lens unit, and a movement condition of each lens unit during zooming, and it also is important to appropriately set a position when the reflecting member is arranged on the optical path.

In particular, in order to obtain a high zoom ratio and reduce a camera thickness, it is important to appropriately set a refractive power of a variable-magnification lens unit located on the object side of the reflecting member, and to set an amount of movement of a lens unit located on the image side of the reflecting member during zooming. If these configurations are not appropriately set, it is difficult to obtain the above-described effects and image deterioration often occurs. In Japanese Patent Application Laid-Open No. 2007-279541, a reflecting member is arranged between the second lens unit and the third lens unit, when counted from the object side. Also, Japanese Patent Application Laid-Open No. 2007-279541 discusses a zoom lens in which a front lens group located on the object side of the reflecting mirror is stored in an empty space formed when the reflecting mirror rotates during the non-photographing state.

In U.S. Pat. No. 7,692,869, the reflecting mirror is arranged within the second lens unit when counted from the object side, and the second lens unit does not move during zooming. Also, U.S. Pat. No. 7,692,869 discusses a zoom lens in which a lens unit located on the image side of the reflecting member is moved toward the image side during a non-photographing state, so that lens units located the object side are stored in the empty space. In these zoom lenses, refractive power of a lens unit having negative refractive power located on the object side of the reflecting member is weaker than refractive powers of the other lens units.

Therefore, a total effective diameter of a front lens unit is increased, or an amount of movement of a lens unit on the image side of the reflecting member during zooming is increased so as to obtain a desired zoom ratio. Also, a camera width tends to be increased. As a result, it is difficult to achieve a high zoom ratio.

SUMMARY OF THE INVENTION

The present invention is directed to a zoom lens which can easily obtain excellent image quality at a high zoom ratio and can easily reduce a camera thickness when applied to a camera, and an image pickup apparatus including the zoom lens.

According to an aspect of the present invention, a zoom lens includes, in order from an object side to an image side, a front lens group including a first lens unit having positive refractive power and a second lens unit having positive or negative refractive power, a reflecting mirror configured to bend an optical path, and a rear lens group including two or more lens units. During zooming, the reflecting mirror is stationary, and the first lens unit and at least two lens units included in the rear lens group move. When the zoom lens is retracted, the reflecting mirror performs at least one operation of a rotation around a rotational shaft and a movement in a direction of an optical axis of the rear lens group, and at least a part of the front lens group is stored in a space formed by the operation of the reflecting mirror, wherein the following conditions are satisfied:

$$0.50 < |(M\mathrm{max} - M\mathrm{min})|/(D - Lp/\sqrt{2}) < 1.00$$

$$10.5 < ft/|fn| < 30.0$$

where fn is a focal length of a lens unit having the highest absolute value of refractive power among lens units having negative refractive power included in the front lens group, ft is a focal length of the entire zoom lens at a telephoto end, Mmax and Mmin are respectively a maximum value and a minimum value of amounts of movement of the at least two units included in the rear lens group during zooming from a wide-angle end to the telephoto end, Lp is a length of a reflecting surface of the reflecting mirror in a cross section including an optical axis of the front lens group and an optical axis of the rear lens group, and D is a maximum effective diameter of the first lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are aberration diagrams of the zoom lens at the wide-angle end and the telephoto end, respectively, according to the first exemplary embodiment.

FIGS. 4A and 4B are aberration diagrams of the zoom lens at the wide-angle end and the telephoto end, respectively, according to the second exemplary embodiment.

FIG. 5 is a lens sectional view of a zoom lens at the wide-angle end according to a third exemplary embodiment of the present invention.

FIGS. 6A and 6B are aberration diagrams of the zoom lens at the wide-angle end and the telephoto end, respectively, according to the third exemplary embodiment.

FIGS. 8A and 8B are aberration diagrams of the zoom lens at the wide-angle end and the telephoto end, respectively, according to the fourth exemplary embodiment.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a front lens group including a first lens unit having positive refractive power and a second lens unit having positive or negative refractive power, a reflecting mirror configured to bend an optical path, and a rear lens group including two or more lens units. During zooming, the reflecting mirror is stationary, and the first lens unit and at least two lens units included in the rear lens group move. When the zoom lens is retracted, the reflecting mirror performs at least one operation of a rotation around a rotational shaft and a movement in a direction of an optical axis of the rear lens group, and at least a part of the front lens group is stored in a space formed by the operation of the reflecting mirror.

Figure 1:
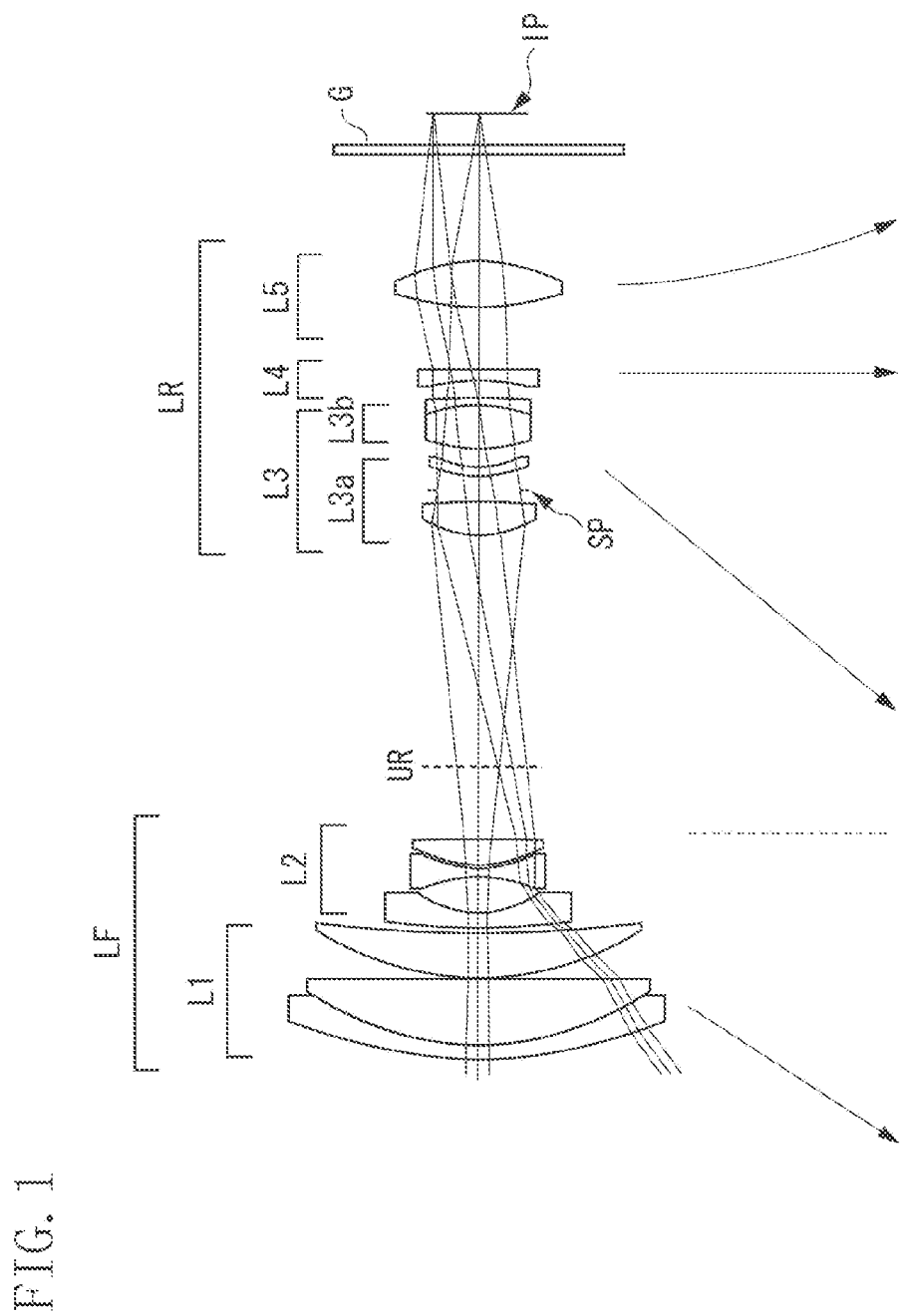
FIG. 1 is a lens sectional view of a zoom lens at the wide-angle end according to a first exemplary embodiment of the present invention.
Figure 3:
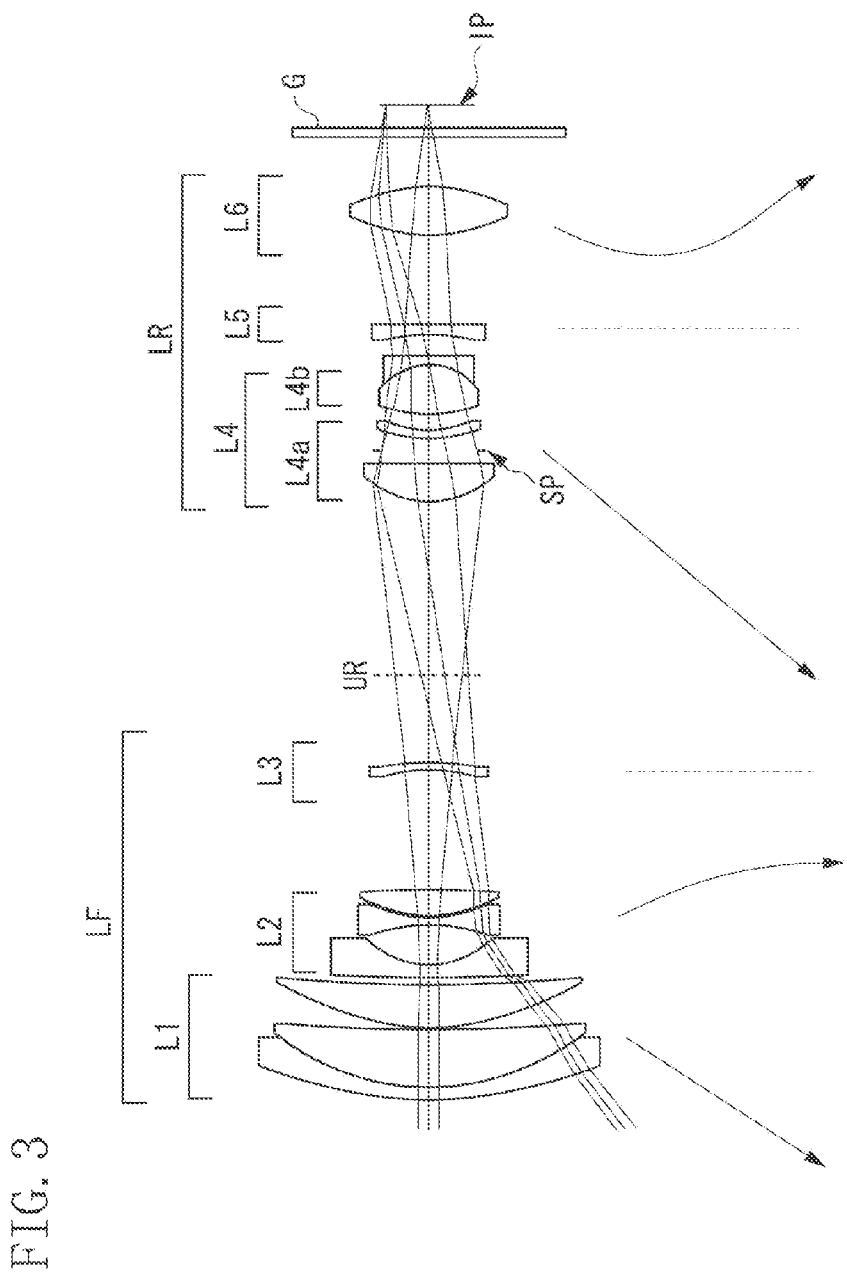
FIG. 3 is a lens sectional view of a zoom lens at the wide-angle end according to a second exemplary embodiment of the present invention.
Figure 4B:
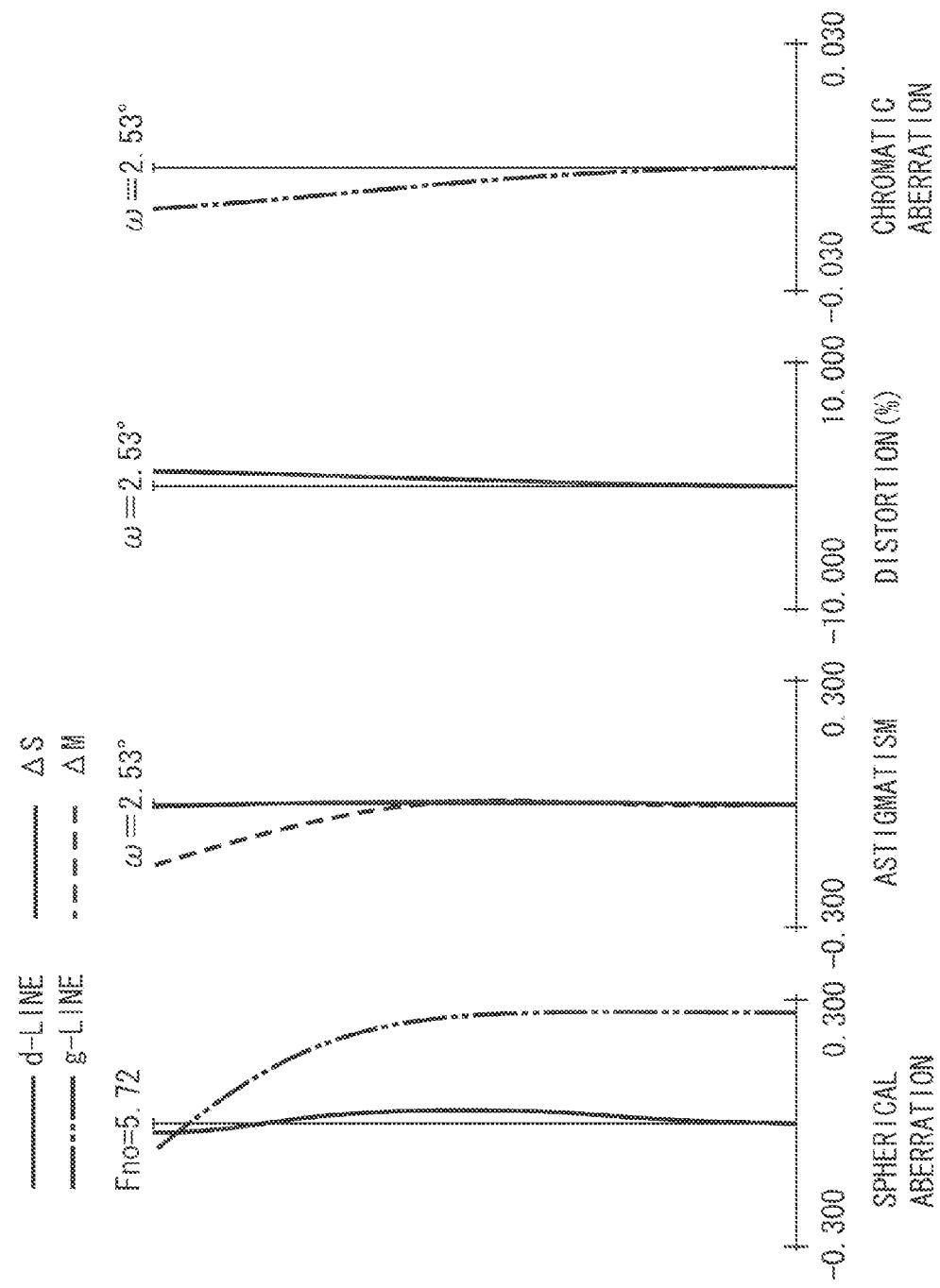

FIG. 1 is a lens sectional view of a zoom lens at the wide-angle end (short focal length end) according to a first exemplary embodiment of the present invention. FIGS. 2A and 2B are aberration diagrams of the zoom lens at the wide-angle end and the telephoto end (long focal length end), respectively, according to the first exemplary embodiment. FIG. 3 is a lens sectional view of a zoom lens at the wide-angle end according to a second exemplary embodiment of the present invention. FIGS. 4A and 4B are aberration diagrams of the zoom lens at the wide-angle end and the telephoto end, respectively, according to the second exemplary embodiment.

Figure 7:
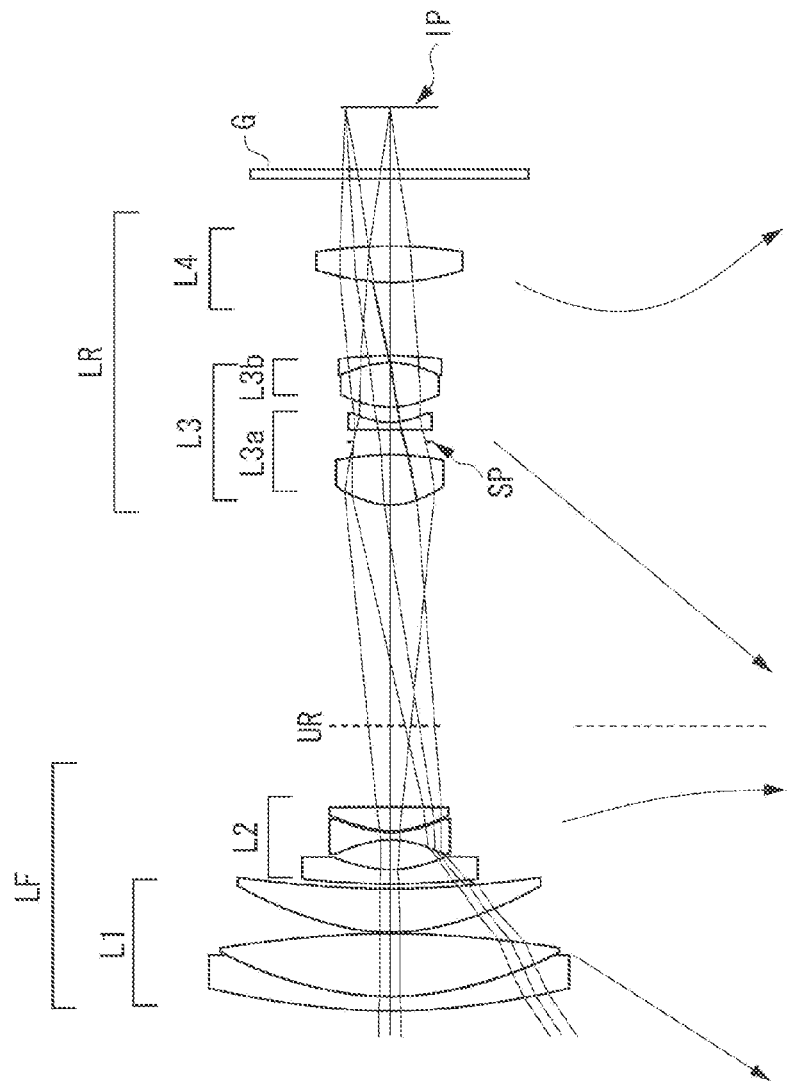
FIG. 7 is a lens sectional view of a zoom lens at the wide-angle end according to a fourth exemplary embodiment of the present invention.
Figure 8A:
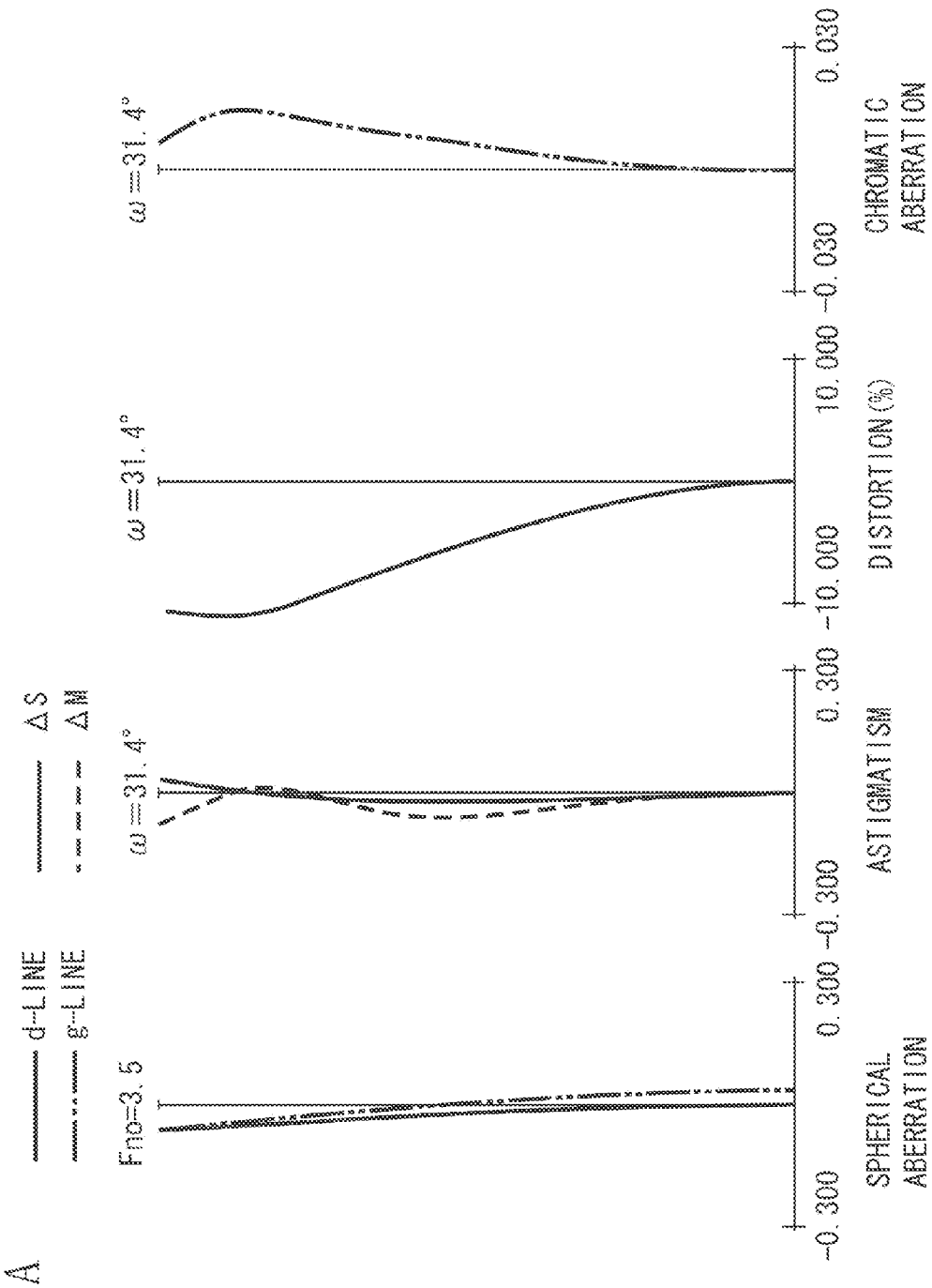
Figure 9:
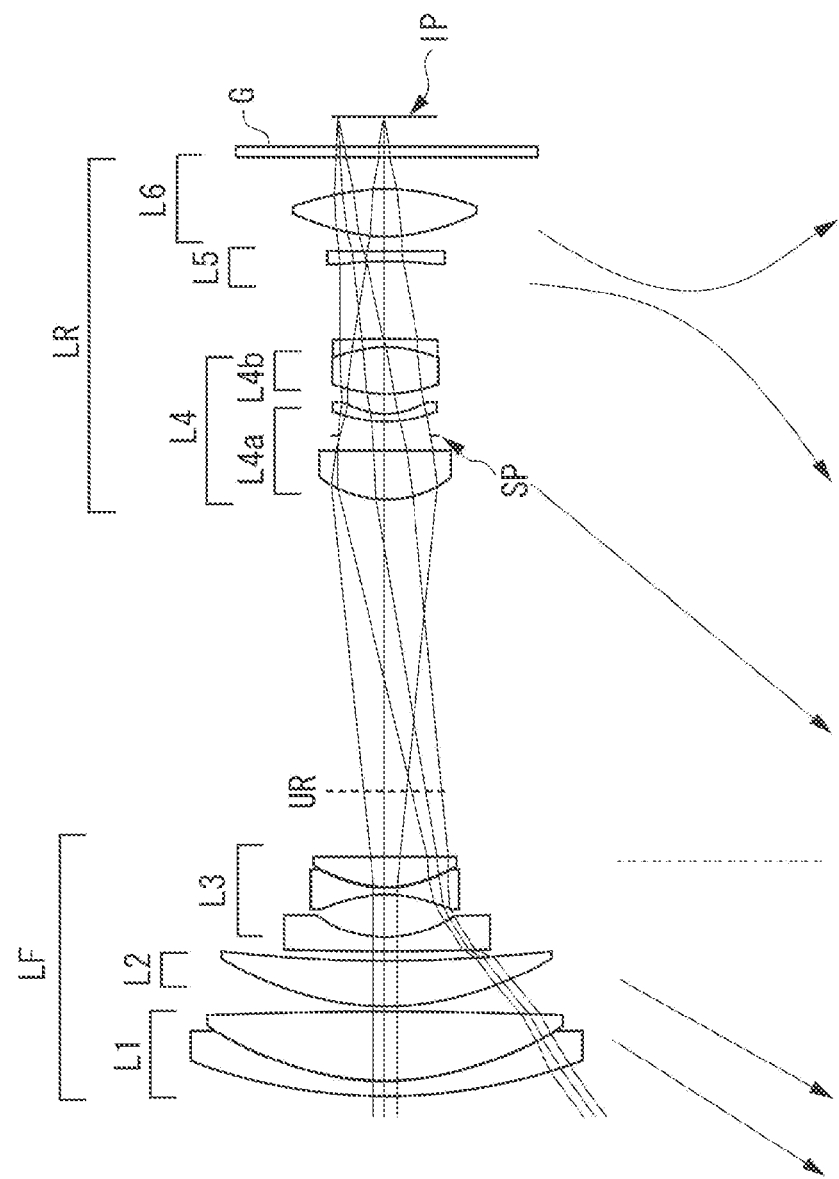
FIG. 9 is a lens sectional view of a zoom lens at the wide-angle end according to a fifth exemplary embodiment of the present invention.
Figure 10A:
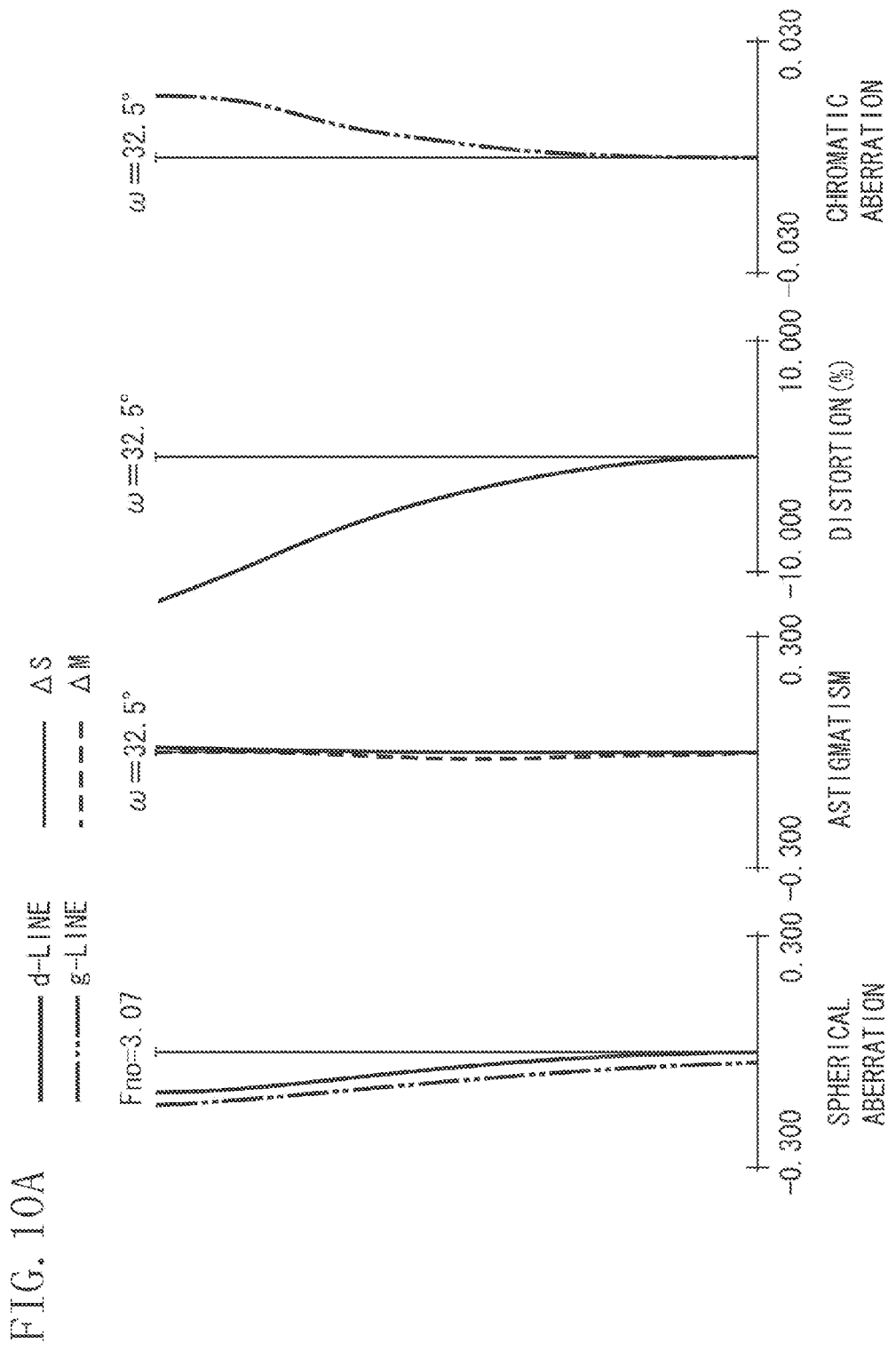
FIGS. 10A and 10B are aberration diagrams of the zoom lens at the wide-angle end and the telephoto end, respectively, according to the fifth exemplary embodiment.
Figure 10B:
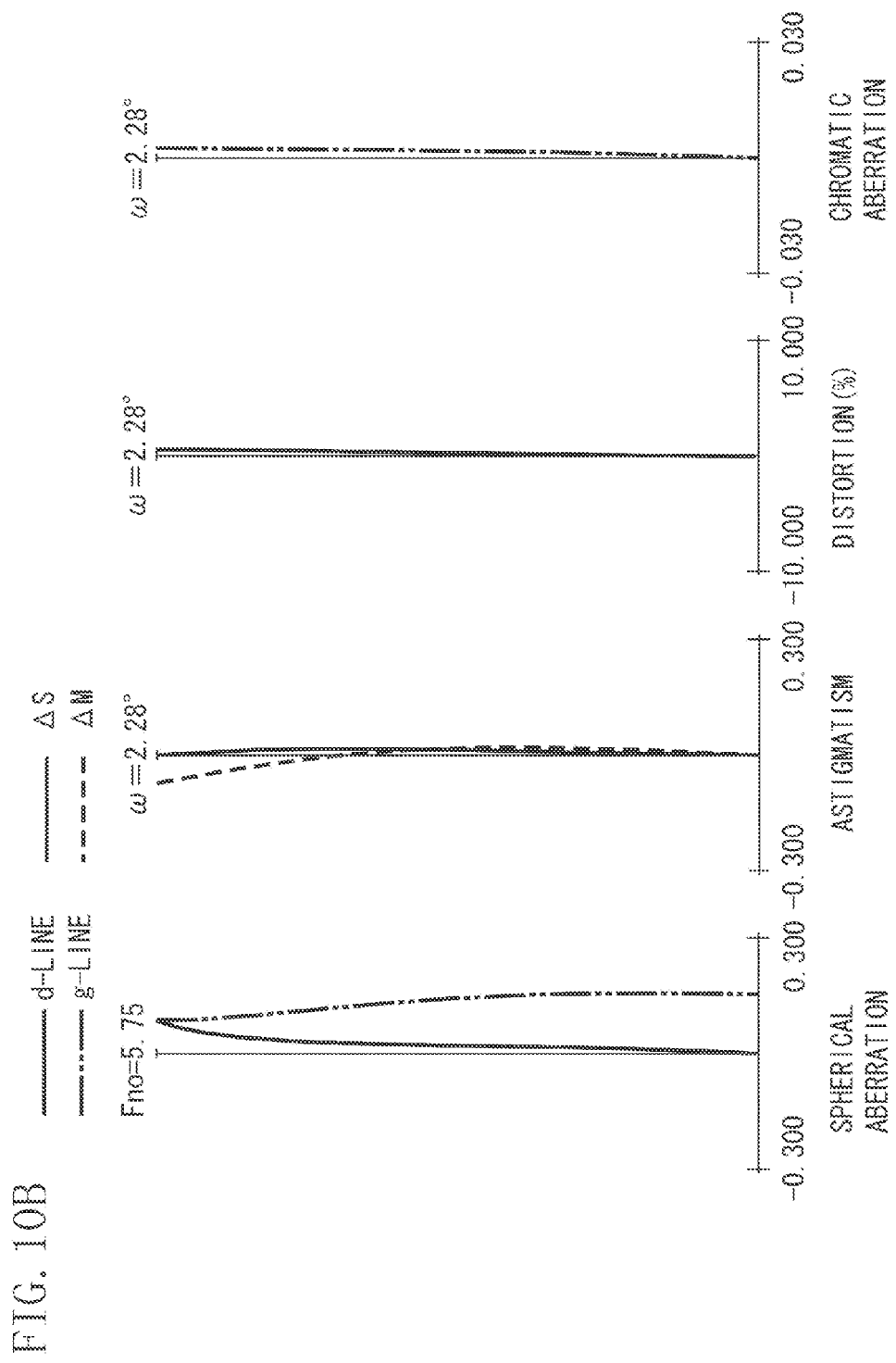

FIG. 5 is a lens sectional view of a zoom lens at the wide-angle end according to a third exemplary embodiment of the present invention. FIGS. 6A and 6B are aberration diagrams of the zoom lens at the wide-angle end and the telephoto end, respectively, according to the third exemplary embodiment. FIG. 7 is a lens sectional view of a zoom lens at the wide-angle end according to a fourth exemplary embodiment of the present invention. FIGS. 8A and 8B are aberration diagrams of the zoom lens at the wide-angle end and the telephoto end, respectively, according to the fourth exemplary embodiment. FIG. 9 is a lens sectional view of a zoom lens at the wide-angle end according to a fifth exemplary embodiment of the present invention. FIGS. 10A and 10B are aberration diagrams of the zoom lens at the wide-angle end and the telephoto end, respectively, according to the fifth exemplary embodiment.

Figure 11A:
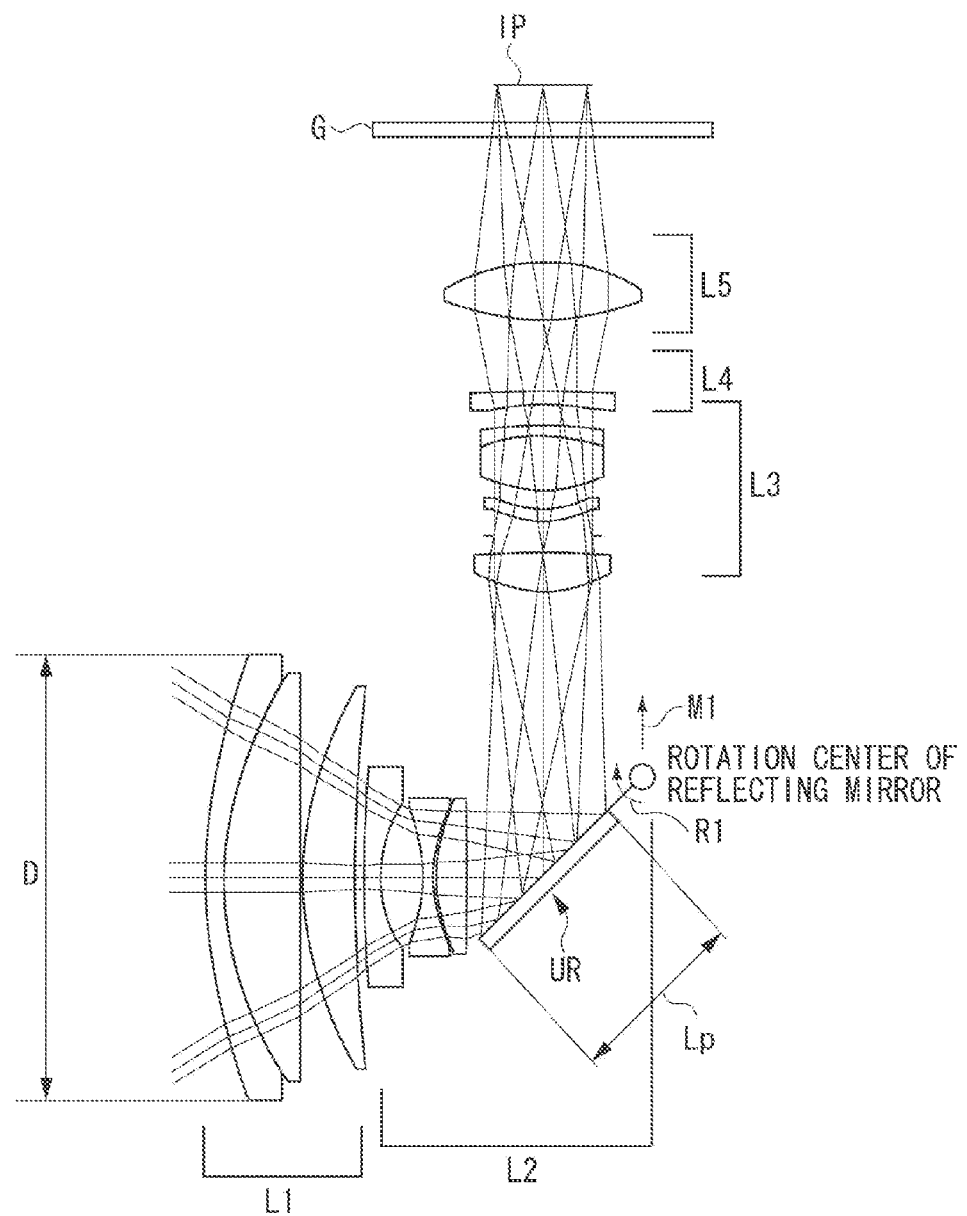
FIG. 11A is a lens sectional view of the zoom lens when an optical path is bent by a reflecting mirror in the first exemplary embodiment.
Figure 11B:
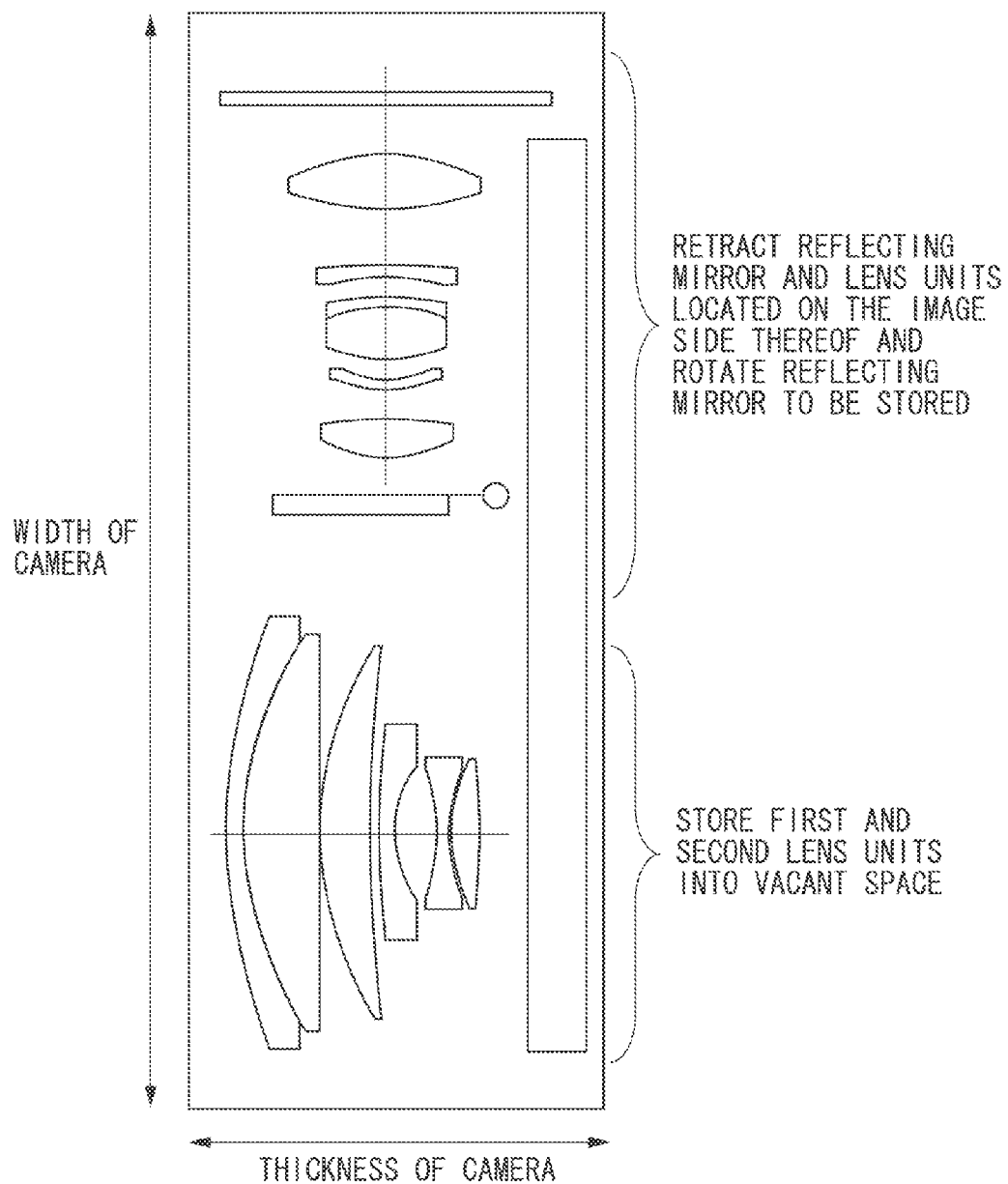
FIG. 11B is a diagram of an image pickup apparatus illustrating a non-photographing state when the zoom lens is retracted, in accordance with an embodiment of the present invention.

In each exemplary embodiment, the optical path is bent by the reflecting mirror provided on the optical path. However, for convenience, an expanded state of the optical path is illustrated in each lens sectional view. FIGS. 11A and 11B are a lens sectional view of the zoom lens when the optical path is bent by the reflecting mirror in the first exemplary embodiment, and an illustration diagram of an image pickup apparatus when the zoom lens is retracted during non-photographing state, respectively.

Figure 12:
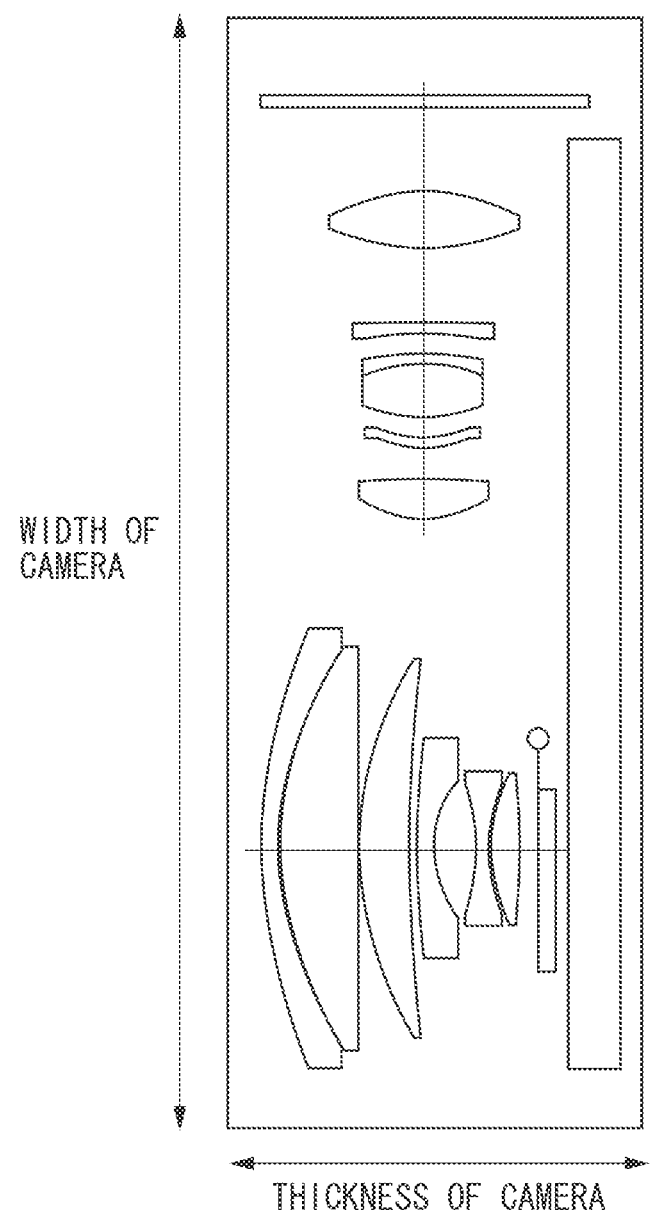
FIG. 12 is an illustration diagram of an image pickup apparatus according to another exemplary embodiment of the present invention, when the zoom lens according to the exemplary embodiment is retracted during a non-photographing state.

FIG. 12 is a diagram of an image pickup apparatus in a non-photographing state, when the zoom lens is retracted during the non-photographing state, according to another exemplary embodiment of the present invention.

The zoom lens according to each exemplary embodiment is a photographic lens systems used for an image pickup apparatus, such as a video camera, a digital camera, and a silver-halide film camera. In each lens sectional view, the left side of the drawing is an object side (front side), and the right side is an image side (rear side). In each lens sectional view, LF denotes the front lens group including the first lens unit L1 having positive refractive power and the second lens unit L2, UR denotes the reflecting mirror configured to bend the optical path by 90° or about 90°, and LR denotes the rear lens group including two or more lens units.

i denotes an order of the lens unit from the object side, and Li denotes an i-th lens unit. SP denotes an aperture stop configured to restrict an F-number light flux. G denotes an optical block, such as an optical filter, a faceplate, a crystal low-pass filter, or an infrared cutoff filter.

IP denotes an image plane. When the zoom lens is used as a photographic optical system of a video camera or a digital still camera, an imaging surface of a solid-state image sensor (photoelectric conversion element), such as a charge-coupled device (CCD) sensor or a complementary metal-oxide semiconductor (CMOS) sensor, is placed on the image plane IP. When the zoom lens is used for a silver-halide film camera, a photosensitive surface corresponding to a film surface is placed on the image plane IP. An arrow indicates a moving locus of each lens unit during zooming from the wide-angle end to the telephoto end. In each aberration diagram, lines d and g denote d-line and g-line, respectively, and $\Delta M$ and $\Delta S$ denote a meridional image plane and a sagittal image plane, respectively. Chromatic aberration of magnification is expressed with the g-line.

$\omega$ denotes a half angle of view (half value of photographing field angle), and Fno denotes an F-number. Also, in each of the following exemplary embodiments, the wide-angle end and the telephoto end refer to zoom positions when a lens unit for variable magnification is positioned at the respective ends of a range in which the lens unit for variable magnification is mechanically movable along an optical axis.

In the zoom lens of each exemplary embodiment, the front lens group LF includes, in order from the object side to the image side, a first lens unit L1 having positive refractive power, and a second lens unit L2 having positive or negative refractive power. The rear lens group LR includes a plurality of lens units. During zooming, the reflecting mirror UR is stationary, and the first lens unit L1 and at least two lens units included in the rear lens group LR move. Since the reflecting member UR configured to bend light from the object side is included on the optical path, the camera becomes thin in a thickness direction.

In the exemplary embodiment, the zoom lens is configured to interchangeably be placed in a non-photographing position (in a non-photographing state) and a photographing position (in a photographing state). Notably, in the non-photographing state, at least part of the zoom lens (front lens group LF) can be retracted into a space provided by an operation of the reflecting member UR. Specifically, when the zoom lens is retracted, the front lens group LF undergoes a moving operation M2 and is stored in a space provided by an operation of the reflecting member UR. In order to reduce a camera width dimension, when the zoom lens is retracted, the reflecting member UR does not require a space in an optical axis direction of the rear lens group (camera width). The reflecting member UR is provided with a reflecting mirror, instead of a conventionally used reflecting prism. In this manner, when the zoom lens is retracted, the reflecting member UR takes much less space than a prism would. The reflecting member UR is provided with the reflecting mirror, and a traveling distance of the movable lens unit moving during zooming is reduced so as to optically reduce the camera width.

Among the respective lens units constituting the front lens group LF arranged on the object side of the reflecting mirror, a negative-refractive-power lens unit having the maximum refractive power, that is, having the largest absolute value of refractive power, is appropriately set. In this manner, the effective diameter of the front lens is reduced, and a desired zoom ratio is easily obtained.

Next, the retraction operation illustrated in FIG. 11B will be described. When the zoom lens is retracted, the reflecting mirror UR and the rear lens group LR move toward the image side, and the reflecting mirror UR rotates around a rotational center. Therefore, a part of the lens units of the front lens group LF is stored in a part of the space of the camera width occurring during the retraction operation. In addition, as the reflecting mirror UR is rotated and retracted, a part of the lens units of the front lens group LF is stored in the empty space. Therefore, the camera thickness is reduced.

In FIGS. 11A and 11B, during non-photographing, the reflecting mirror UR performs both of the rotating operation R1 of rotating around the rotational shaft rotatably supporting the reflecting mirror UR and the moving operation M1 of moving in a direction parallel to the optical axis of the rear lens group LR, but may perform either of the rotating operation and the moving operation. For example, as illustrated in FIG. 12, during the retraction operation, the reflecting mirror UR does not move in the direction parallel to the optical axis of the rear lens group R, but simply rotates around the rotational center. Therefore, the reflecting mirror UR may be stored such that a line normal to the reflecting surface of the reflecting mirror UR becomes parallel to the optical axis of the front lens group LF. Expressed in another way, the reflecting mirror UR may be stored such that the reflecting surface of the reflecting mirror UR becomes substantially parallel to the optical axis of the rear lens group LR.

In each exemplary embodiment, the front lens group LF is arranged on the object side with reference to the reflecting mirror UR, and the rear lens group LR is arranged on the image side with reference to the reflecting mirror UR. The reflecting mirror UR bends the optical axis of the front lens group LF by about 90° (±10° and guides it toward the optical axis of the rear lens group LR. In other words, in the photographing state, the reflecting mirror UR bends the optical path of light passing through the front lens group LF by about) 90° (±10° and guides the light through the rear lens group LR to the image plane IP.

In each exemplary embodiment, fn denotes the focal length of a lens unit having the highest absolute value of refractive power among lens units having negative refractive power included in the front lens group LF. ft denotes the focal length of the entire zoom lens at the telephoto end. Mmax and Mmin respectively denote a maximum value and a minimum value of amounts of movement of the at least two lens units included in the rear lens group LR during zooming from the wide-angle end to the telephoto end. Lp denote the length of the reflecting surface of the reflecting mirror UR in the cross section including the optical axis of the front lens group LF and the optical axis of the rear lens group LR, and D denotes the maximum effective diameter of the first lens unit L1. In this case, the following conditions are satisfied:

$$0.50<|(Mmax-Mmin)|/(D-Lp/\sqrt{2})<1.00 \quad (1)$$

$$10.5<ft/|fn|<30.0 \quad (2)$$

The amount of movement of a lens unit during zooming from the wide-angle end to the telephoto end refers to a difference between a position of the lens unit closest to the object side and a position of the lens unit closest to the image side during zooming from the wide-angle end to the telephoto end.

The zoom lens of each exemplary embodiment is a positive lead-type zoom lens in which a lens unit closest to the object side has positive refractive power. The zoom lens having a high zoom ratio is realized in such a manner that, during zooming, the reflecting mirror UR is stationary, and the first lens unit L1 and at least two lens units of the rear lens group LR move. In addition, a part of the front lens group LF arranged on the object side with respect to the reflecting mirror UR is stored during the retraction operation, thereby achieving a reduction in the camera thickness.

The condition (1) defines a relation of the amount of movement of the lens units included in the rear lens group LR during zooming, the maximum effective diameter of the first lens unit L1 (outer diameter of the front lens), and the size of the reflecting mirror UR. If the lower limit of the condition (1) is exceeded, the space for storing the first lens unit L1 is difficult to install in the camera width direction. On the other hand, if the upper limit of the condition (1) is exceeded, the variable magnification stroke by the variable magnification of the rear lens group LR becomes too large. Therefore, the camera width is increased. If the numerical range of the condition (1) is set as follows, it is easy to realize a more compact camera.

$$0.60<|(Mmax-Mmin)|/(D-Lp/\sqrt{2})<1.00 \quad (1a)$$

The condition (2) defines the focal length of the lens unit having the greatest absolute value of refractive power among the negative-refractive-power lens units included in the front lens group LF. If the lower limit of the condition (2) is exceeded, the refractive power of the lens unit having the greatest absolute value of refractive power among the negative-refractive-power lens units included in the front lens group LF becomes too weak. Therefore, it is difficult to obtain a desired zoom ratio. On the other hand, if the upper limit of the condition (2) is exceeded, the refractive power of the lens unit having the greatest absolute value of refractive power among the negative-refractive-power lens units included in the front lens group LF becomes too strong. In particular, the edge thickness of the negative lens is increased. Therefore, it is difficult to reduce the camera thickness.

If the numerical range of the condition (2) is set as follows, it is easy to realize a more compact camera.

$$12.0 < ft/|fn| < 20.0 \quad (2a)$$

According to each exemplary embodiment, the reduction in size of the camera is facilitated, and the zoom lens having a high zoom ratio can be obtained. However, it is more desirable to satisfy one or more of the following conditions.

Lmax denotes a maximum value of a lens configuration length of the two or more lens units constituting the rear lens group LR. fr denotes the focal length of the lens unit arranged closest to the image side in the rear lens group LR. The lens unit having the greatest absolute value of refractive power among the negative-refractive-power lens units included in the front lens group LF includes two or more negative lenses, and Nn denotes the average refractive indices of materials of the two or more negative lenses. Zf denotes the variable magnification ratio of the front lens group LF, and Zr denotes the variable magnification ratio of the rear lens group LR. In this case, it is desirable to satisfy one or more of the following conditions:

$$0.50 < Lmax/(Lp\sqrt{2}) < 2.00 \quad (3)$$

$$0.10 < fr/ft < 0.40 \quad (4)$$

$$1.85 < Nn < 2.00 \quad (5)$$

$$1.50 < Zf/Zr < 6.00 \quad (6)$$

The technical significance of the above conditions will be described below.

The condition (3) defines the thickness of the lens unit having the longest lens configuration length among the lens units constituting the rear lens group LR. If the lower limit of the condition (3) is exceeded, the reflecting mirror UR becomes too large. Therefore, the camera size is increased. On the other hand, if the upper limit of the condition (3) is exceeded, the lens thickness of the rear lens group LR during the retraction operation becomes too large. Therefore, the space occupied by the rear lens group LR is increased, and the camera width is increased. If the numerical range of the condition (3) is set as follows, it is easy to realize a more compact camera.

$$1.00 < Lmax/(Lp\sqrt{2}) < 1.70 \quad (3a)$$

The condition (4) defines the focal length of the last lens unit arranged closest to the image side. If the lower limit of the condition (4) is exceeded, the refractive power of the last lens unit is increased. Therefore, the effective diameter of the last lens unit is increased, and the camera thickness is increased. On the other hand, if the upper limit of the condition (4) is exceeded, it is difficult to secure a sufficient variable magnification ratio by the rear lens group LR. Therefore, the variable magnification sharing by the lens unit on the object side of the reflecting mirror UR and the amount of movement by zooming are increased, and the camera thickness is increased. If the numerical range of the condition (4) is set as follows, it is easy to realize a more compact camera.

$$0.10 < fr/ft < 0.33 \quad (4a)$$

The lens unit having the greatest absolute value of refractive power among the negative-refractive-power lens units included in the front lens group LF includes two or more negative lenses.

The condition (5) defines the average refractive index of materials of the negative lens having the greatest absolute value of refractive power among the negative-refractive-power lens units included in the front lens group LF. If the lower limit of the condition (5) is exceeded, the edge thickness of the negative lens is increased. Therefore, the camera thickness is increased. On the other hand, in the material exceeding the upper limit of the condition (5), a high-dispersion material is generally used, and chromatic aberration correction becomes difficult. Hence, the lens configuration becomes complicated, and the camera size is increased. If the numerical range of the condition (5) is set as follows, it is easy to realize a more compact camera.

$$1.85 < N2n < 1.95 \quad (5a)$$

The condition (6) defines a relation of the variable magnification ratio of the front lens group LF with respect to the rear lens group LR. If the lower limit of the condition (6) is exceeded, the variable magnification sharing by the front lens group LF becomes too small. Therefore, the horizontal width of the camera is increased. On the other hand, if the upper limit of the condition (6) is exceeded, the variable magnification sharing by the front lens group LF becomes too large. Therefore, it is difficult to reduce the camera thickness. If the numerical range of the condition (6) is set as follows, it is easy to realize a compact camera having excellent balance.

$$1.50 < Zf/Zr < 5.50 \quad (6a)$$

In each exemplary embodiment, as illustrated in FIG. 12, the reflecting mirror UR may rotate around the rotational center supporting the reflecting mirror UR during non-photographing. A part of the front lens group LF may be stored in the resultant space.

Therefore, with respect to the camera width direction during the retraction operation, the front lens group LF disposed on the object side may be stored by efficiently using the space occupied by the reflecting mirror UR. Also, as illustrated in FIG. 11B, during non-photographing, the reflecting mirror UR may perform both of the rotating operation and the operation of moving in a direction substantially perpendicular to the optical axis of the front lens group LF. Therefore, with respect to the camera width direction, a part of the front lens group LF disposed on the object side may be stored by efficiently using the space occupied by the reflecting mirror UR.

The lens unit arranged closest to the object side among the lens units constituting the rear lens group LR includes a first lens subunit, and a second lens subunit configured to move an imaging position in a direction perpendicular to the optical axis by moving in a direction having a component of a direction perpendicular to the optical axis. The high-zoom-ratio zoom lens having the reflecting mirror may be configured such that the movable lens approaches the reflecting mirror side during zooming from the wide-angle end to the telephoto end.

In this case, any of the lens units of the rear lens group LR are divided into a plurality of partial lens units, and the lens units of the image side are moved to have a component of a direction perpendicular to the optical axis. Therefore, it is possible to prevent the interference of the lens units with respect to the bent optical path, in particular, at the telephoto end, and it is easy to correct a camera shake. Next, the lens configuration of the zoom lens of each exemplary embodiment will be described.

Hereinafter, a zoom lens according to the first exemplary embodiment of the present invention will be described with reference to FIG. 1. A front lens group LF includes, in order from an object side to an image side, a first lens unit L1 having positive refractive power, and a second lens unit L2 having negative refractive power. A rear lens group LR includes, in order from the object side to the image side, a third lens unit L3 having positive refractive power, a fourth lens unit L4 having negative refractive power, and a fifth lens unit L5 having positive refractive power. A reflecting mirror UR is disposed between the second lens unit L2 and the third lens unit L3.

During zooming from the wide-angle end to the telephoto end, the second lens unit L2, the reflecting mirror UR, and the fourth lens unit L4 are stationary. The first lens unit L1 moves linearly toward the object side, or moves with a locus convex toward the image side. The third lens unit L3 moves toward the object side and performs variable magnification. In order to correct a variation in a position of an image plane according to the variable magnification, the fifth lens unit L5 moves nonlinearly toward the image side.

In the present exemplary embodiment, the zoom lens having a high zoom ratio of, for example, about 13 is realized in such a manner that, during zooming, the reflecting mirror UR and the second and fourth lens units L2 and L4 are stationary, and the first, third, and fifth lens units L1, L3, and L5 move. During focusing, the fifth lens unit L5 moves.

In the present exemplary embodiment, the value of the condition (1) is 0.98, and the value of the condition (2) is 12.2. Therefore, a compact camera having a high zoom ratio is realized. The value of the condition (3) on the thickness of the third lens unit L3 having the maximum lens configuration length among the lens units constituting the rear lens group LR is 1.32. Also, the value of the condition (4) on the refractive power of the last lens unit is 0.22, which is a strong refractive power arrangement. A driving amount of the rear lens group LR during variable magnification is reduced.

The second lens unit L2 corresponds to the lens unit having the greatest absolute value of refractive power among the negative-refractive-power lens units included in the front lens group LF. Since the refractive power of the second lens unit L2 is strong, the second lens unit L2 is made of a material having 1.87 as the value of the condition (5) on the average refractive index of materials of the negative lenses included in the second lens unit L2. Also, in the exemplary embodiment, the third lens unit L3 includes a first lens subunit L3a and a second lens subunit L3b. The second lens subunit L3b performs a camera shake correction.

Hereinafter, a zoom lens according to the second exemplary embodiment of the present invention will be described with reference to FIG. 3. A front lens group LF includes, in order from an object side to an image side, a first lens unit L1 having positive refractive power, a second lens unit L2 having negative refractive power, and a third lens unit L3 having negative refractive power. A rear lens group LR includes, in order from the object side to the image side, a fourth lens unit L4 having positive refractive power, a fifth lens unit L5 having negative refractive power, and a sixth lens unit L6 having positive refractive power. A reflecting mirror UR is disposed between the third lens unit L3 and the fourth lens unit L4.

In the zoom lens of the second exemplary embodiment, the zoom lens having a high zoom ratio of, for example, about 15 is realized in such a manner that, during zooming, the reflecting mirror UR and the third and fifth lens units L3 and L5 are stationary, and the first, second, fourth, and sixth lens units L1, L2, L4, and L6 move.

Specifically, during zooming from the wide-angle end to the telephoto end, the first lens unit L1 moves linearly toward the object side, or moves with a locus convex toward the image side. The second lens unit L2 moves with a locus convex toward the image side. The fourth lens unit L4 moves toward the object side. The fifth lens unit L5 moves with a locus convex toward the object side. During focusing, the sixth lens unit L6 moves. In the present exemplary embodiment, the value of the condition (1) is 0.70, and the value of the condition (2) is 12.6. Therefore, a compact camera having a high zoom ratio is realized.

The value of the condition (3) on the thickness of the fourth lens unit L4 having the maximum lens configuration length among the lens units constituting the rear lens group LR is 1.46. Also, the value of the condition (4) on the refractive power of the last lens unit is 0.16, which is a strong refractive power arrangement. A driving amount of the rear lens group LR during variable magnification is reduced. The second lens unit L2 corresponds to the lens unit having the greatest absolute value of refractive power among the negative-refractive-power lens units included in the front lens group LF.

Since the refractive power of the second lens unit L2 is strong, the second lens unit L2 is made of a material having 1.87 as the value of the condition (5) on the average refractive index of materials of the negative lenses included in the second lens unit L2. Also, in the exemplary embodiment, the fourth lens unit L4 includes a first lens subunit L4a and a second lens subunit L4b. The second lens subunit L4b performs a camera shake correction. The other points are similar to those of the first exemplary embodiment.

Hereinafter, a zoom lens according to the third exemplary embodiment of the present invention will be described with reference to FIG. 5. A front lens group LF includes, in order from an object side to an image side, a first lens unit L1 having positive refractive power, and a second lens unit L2 having negative refractive power. A rear lens group LR includes, in order from the object side to the image side, a third lens unit L3 having negative refractive power, a fourth lens unit L4 having positive refractive power, a fifth lens unit L5 having negative refractive power, and a sixth lens unit L6 having positive refractive power. A reflecting mirror UR is disposed between the second lens unit L2 and the third lens unit L3.

In the zoom lens of the third exemplary embodiment, the zoom lens having a high zoom ratio of, for example, about 15 is realized in such a manner that, during zooming, the reflecting mirror UR and the third and fifth lens unit L3 and L5 are stationary, and the first, second, fourth, and sixth lens units L1, L2, L4, and L6 move. The moving locus of each lens unit during zooming from the wide-angle end to the telephoto end in the third exemplary embodiment is similar to the moving locus in the second exemplary embodiment. During focusing, the sixth lens unit L6 moves.

In the present exemplary embodiment, the value of the condition (1) is 0.90, and the value of the condition (2) is 12.5. Therefore, a compact camera having a high zoom ratio is realized.

The value of the condition (3) on the thickness of the fourth lens unit L4 having the maximum lens configuration length among the lens units constituting the rear lens group LR is 1.39. Also, the value of the condition (4) on the refractive power of the last lens unit is 0.18, which is a strong refractive power arrangement. A driving amount of the rear lens group LR during variable magnification is reduced. The second lens unit L2 corresponds to the lens unit having the greatest absolute value of refractive power among the negative-refractive-power lens units included in the front lens group LF. Since the refractive power of the second lens unit L2 is strong, the second lens unit L2 is made of a material having 1.92 as the value of the condition (5) on the average refractive index of materials of the negative lenses included in the second lens unit L2.

Also, in the present exemplary embodiment, the fourth lens unit L4 includes a first lens subunit L4a and a second lens subunit L4b. The second lens subunit L4b performs a camera shake correction. The other points are similar to those of the first exemplary embodiment.

Hereinafter, a zoom lens according to the fourth exemplary embodiment of the present invention will be described with reference to FIG. 7. A front lens group LF includes, in order from an object side to an image side, a first lens unit L1 having positive refractive power, and a second lens unit L2 having negative refractive power. A rear lens group LR includes a third lens unit L3 having positive refractive power, and a fourth lens unit L4 having positive refractive power. A reflecting mirror UR is disposed between the second lens unit L2 and the third lens unit L3.

In the zoom lens of the fourth exemplary embodiment, the zoom lens having a high zoom ratio of, for example, about 16 is realized in such a manner that, during zooming, the reflecting mirror UR is stationary, and the first to fourth lens units L1 to L4 move. Specifically, during zooming from the wide-angle end to the telephoto end, the first lens unit L1 moves linearly toward the object side, or moves with a locus convex toward the image side. The second lens unit L2 moves with a locus convex toward the image side. The third lens unit L3 moves toward the object side. The fourth lens unit L4 moves with a locus convex toward the object side. During focusing, the fourth lens unit L4 moves.

In the present exemplary embodiment, the value of the condition (1) is 0.63, and the value of the condition (2) is 17.1. Therefore, a compact camera having a high zoom ratio is realized. The value of the condition (3) on the thickness of the third lens unit L3 having the maximum lens configuration length among the lens units constituting the rear lens group LR is 1.49. Also, the value of the condition (4) on the refractive power of the last lens unit is 0.31, which is a strong refractive power arrangement. A driving amount of the rear lens group LR during variable magnification is reduced. The second lens unit L2 corresponds to the lens unit having the greatest absolute value of refractive power among the negative-refractive-power lens units included in the front lens group LF.

Since the refractive power of the second lens unit L2 is strong, the second lens unit L2 is made of a material having 1.87 as the value of the condition (5) on the average refractive index of materials of the negative lenses included in the second lens unit L2. Also, in the present exemplary embodiment, the third lens unit L3 includes a first lens subunit L3a and a second lens subunit L3b. The second lens subunit L3b performs a camera shake correction. The other points are similar to those of the first exemplary embodiment.

Hereinafter, a zoom lens according to the fifth exemplary embodiment of the present invention will be described with reference to FIG. 9. A front lens group LF includes, in order from an object side to an image side, a first lens unit L1 having positive refractive power, a second lens unit L2 having positive refractive power, and a third lens unit L3 having negative refractive power. A rear lens group LR includes, in order from the object side to the image side, a fourth lens unit L4 having positive refractive power, a fifth lens unit L5 having negative refractive power, and a sixth lens unit L6 having positive refractive power. A reflecting mirror UR is disposed between the third lens unit L3 and the fourth lens unit L4.

In the zoom lens of the fifth exemplary embodiment, the zoom lens having a high zoom ratio of, for example, about 16 is realized in such a manner that, during zooming, the reflecting mirror UR and the third lens unit L3 are stationary, and the first, second, fourth, fifth, and sixth lens units L1, L2, L4, L5, and L6 move. Specifically, during zooming from the wide-angle end to the telephoto end, the first, second, and fourth lens units L1, L2, and L4 move toward the object side. The fifth lens unit L5 moves with a locus convex toward the image side. The sixth lens unit L6 moves with a locus convex toward the object side.

During focusing, the sixth lens unit L6 moves. In the present exemplary embodiment, the value of the condition (1) is 0.83, and the value of the condition (2) is 15.7. Therefore, a compact camera having a high zoom ratio is realized.

The value of the condition (3) on the thickness of the fourth lens unit L4 having the maximum lens configuration length among the lens units constituting the rear lens group LR is 1.47. Also, the value of the condition (4) on the refractive power of the last lens unit is 0.19, which is a strong refractive power arrangement. A driving amount of the rear lens group LR during variable magnification is reduced.

The third lens unit L3 corresponds to the lens unit having the greatest absolute value of refractive power among the negative-refractive-power lens units included in the front lens group LF. Since the refractive power of the third lens unit L3 is strong, the third lens unit L3 is made of a material having 1.87 as the value of the condition (5) on the average refractive index of materials of the negative lenses included in the third lens unit L2. Also, in the present exemplary embodiment, the fourth lens unit L4 includes a first lens subunit L4a and a second lens subunit L4b. The second lens subunit L4b performs a camera shake correction. The other points are similar to those of the first exemplary embodiment.

In all zoom lenses of the first to fifth exemplary embodiments, the control of the opening size of the aperture stop may be performed so as to reduce a variation in F-number during zooming. Also, when the zoom lens is combined with an image pickup apparatus including an image sensor configured to convert an optical image formed on a light receiving surface into an electrical signal, distortion aberration may be electrically corrected.

Next, numerical examples 1 to 5 respectively corresponding to the first to fifth exemplary embodiments of the present invention will be described. In each numerical example, i denotes an order of an optical surface from the object side. ri denotes a radius of curvature of an i-th optical surface (i-th surface), di denotes a distance between an i-th surface and an (i+1) th surface, ndi and vdi respectively denote refractive index and Abbe number of a material of an i-th optical member with respect to d-line. Also, when k denotes a conic constant, A4, A6, A8, and A10 denote aspheric coefficients, and X denotes a displacement from a surface vertex along an optical axis at a position of a height H from the optical axis, an aspheric surface shape is expressed as:

$$x=(h^2/R)/[1+[1-(1+k)(h/R)^2]^{1/2}]+A4h^4+A6h^6+A8h^8+A10h^{10}$$

R is a paraxial radius of curvature. Also, for example, the expression "E-Z" represents "$10^{-z}$". In each numerical example, the last two surfaces are surfaces of optical blocks such as a filter or a faceplate. In each exemplary embodiment, aback focus (BF) is represented by a distance from an image-side surface of the optical block to an image plane. A total lens length is defined as the sum of the back focus and a distance from a surface closest to the object side to the last surface. Also, the correspondence to the conditions described above in each numerical example is given in Table 1 below.

Numerical Example 1

| | | Unit: mm | | | | |
|---|---|---|---|---|---|---|
| | | Surface Data | | | | |
| Surface Number | r | d | nd | vd | Effective Diameter | Outer Diameter |
| 1 | 36.280 | 1.10 | 1.84666 | 23.8 | 27.32 | 28.5 |
| 2 | 22.075 | 5.00 | 1.49700 | 81.5 | 25.18 | |
| 3 | 3819.484 | 0.10 | | | 24.91 | |
| 4 | 21.953 | 3.40 | 1.71300 | 53.9 | 23.62 | |
| 5 | 83.784 | (Variable) | | | 23.08 | |
| 6 | 67.363 | 1.05 | 1.84954 | 40.1 | 12.55 | |
| 7* | 7.239 | 2.86 | | | 9.23 | |
| 8 | −11.608 | 0.60 | 1.88300 | 40.8 | 8.77 | |
| 9 | 8.601 | 0.19 | | | 8.49 | |
| 10 | 9.629 | 2.04 | 1.94595 | 18.0 | 8.57 | |
| 11 | −92.242 | 4.80 | | | 8.51 | |
| 12 | ∞ | (Variable) | | | 11.31 | |
| 13* | 8.197 | 2.52 | 1.55332 | 71.7 | 7.44 | |
| 14* | −83.098 | 1.00 | | | 6.92 | |
| 15 (Stop) | ∞ | 1.00 | | | 6.31 | |
| 16 | 9.731 | 0.60 | 1.84666 | 23.8 | 6.32 | |
| 17 | 6.137 | 1.40 | | | 6.05 | |
| 18 | 10.932 | 3.42 | 1.54814 | 45.8 | 6.63 | |
| 19 | −10.241 | 0.60 | 1.80610 | 33.3 | 6.53 | |
| 20 | −44.165 | (Variable) | | | 6.65 | |
| 21 | −16.021 | 0.70 | 1.77250 | 49.6 | 7.60 | |
| 22 | 232.382 | (Variable) | | | 7.91 | |
| 23* | 14.352 | 3.61 | 1.48749 | 70.2 | 11.05 | |
| 24 | −13.063 | (Variable) | | | 11.19 | |
| 25 | ∞ | 0.80 | 1.51633 | 64.1 | 20.00 | |
| 26 | ∞ | | | | 20.00 | |
| Image Plane | ∞ | | | | | |

Aspheric Surface Data

Seventh Surface

K = −2.66260e−001  A4 = 1.25506e−004  A6 = −1.40891e−005
A8 = 1.00423e−006  A10 = −2.39914e−008

Thirteenth Surface

K = −2.33750e−001  A4 = −3.57071e−005  A6 = −1.50723e−006
A8 = 1.80588e−008

Fourteenth Surface

K = 0.00000e+000  A4 = 4.19704e−005

Twenty-third Surface

K = 0.00000e+000  A4 = −2.08667e−004  A6 = 1.38190e−006
A8 = −2.20568e−008

Various Data
Zoom Ratio 12.75

| | Wide Angle | Middle | Telephoto |
|---|---|---|---|
| Focal Length | 5.18 | 22.00 | 66.05 |
| F-number | 3.07 | 4.67 | 6.42 |
| Half Angle of View | 33.59 | 8.89 | 2.98 |
| Image Height | 3.44 | 3.44 | 3.44 |
| Total Lens Length | 72.08 | 82.71 | 88.34 |
| BF | 2.37 | 2.37 | 2.37 |
| d5 | 0.50 | 11.14 | 16.87 |
| d12 | 18.28 | 6.91 | 4.30 |
| d20 | 1.36 | 12.73 | 15.29 |
| d22 | 4.68 | 5.05 | 10.75 |
| d24 | 8.10 | 7.72 | 1.97 |
| Entrance Pupil Position | 17.46 | 59.48 | 143.60 |
| Exit Pupil Position | −61.28 | 152.44 | 38.52 |
| Front Principal Point Position | 22.22 | 84.71 | 330.31 |
| Front Principal Point Position | −2.81 | −19.63 | −63.68 |

-continued

| Unit: mm | | | | | |
|---|---|---|---|---|---|
| Zoom Lens Unit Data | | | | | |
| Unit | Starting Surface | Focal Length | Lens Configuration Length | Front Principal Point Position | Rear Principal Point Position |
| 1 | 1 | 32.00 | 9.59 | 2.33 | −3.75 |
| 2 | 6 | −5.41 | 11.54 | 1.45 | −8.21 |
| 3 | 13 | 14.26 | 10.55 | 0.39 | −7.75 |
| 4 | 21 | −19.38 | 0.70 | 0.03 | −0.37 |
| 5 | 23 | 14.66 | 3.61 | 1.33 | −1.21 |
| GB | 25 | ∞ | 0.80 | 0.26 | −0.26 |

| Single-lens Data | | |
|---|---|---|
| Lens | Starting Surface | Focal Length |
| 1 | 1 | −69.04 |
| 2 | 2 | 44.66 |
| 3 | 4 | 40.79 |
| 4 | 6 | −9.62 |
| 5 | 8 | −5.52 |
| 6 | 10 | 9.31 |
| 7 | 13 | 13.62 |
| 8 | 16 | −21.25 |
| 9 | 18 | 10.23 |
| 10 | 19 | −16.67 |
| 11 | 21 | −19.38 |
| 12 | 23 | 14.66 |
| 13 | 25 | 0.00 |

Numerical Example 2

| Unit: mm | | | | | | |
|---|---|---|---|---|---|---|
| Surface Data | | | | | | |
| Surface Number | r | d | nd | vd | Effective Diameter | Outer Diameter |
| 1 | 34.288 | 1.10 | 1.84666 | 23.8 | 26.50 | 27.50 |
| 2 | 20.047 | 4.76 | 1.49700 | 81.5 | 24.13 | |
| 3 | 157.849 | 0.10 | | | 23.92 | |
| 4 | 22.449 | 3.42 | 1.77250 | 49.6 | 23.37 | |
| 5 | 106.336 | (Variable) | | | 22.91 | |
| 6 | 102.105 | 1.05 | 1.84954 | 40.1 | 14.07 | |
| 7* | 7.207 | 3.24 | | | 10.15 | |
| 8 | −17.054 | 0.60 | 1.88300 | 40.8 | 9.85 | |
| 9 | 10.643 | 0.10 | | | 9.63 | |
| 10 | 10.710 | 2.17 | 1.94595 | 18.0 | 9.74 | |
| 11 | −238.729 | (Variable) | | | 9.62 | |
| 12 | −14.788 | 0.60 | 1.48749 | 70.2 | 8.13 | |
| 13 | −22.527 | 4.50 | | | 8.21 | |
| 14 | ∞ | (Variable) | | | 11.31 | |
| 15* | 7.500 | 3.13 | 1.55332 | 71.7 | 9.00 | |
| 16* | −67.550 | 1.00 | | | 8.33 | |
| 17 (Stop) | ∞ | 1.00 | | | 7.59 | |
| 18 | 12.503 | 0.60 | 1.84666 | 23.8 | 7.17 | |
| 19 | 8.424 | 1.27 | | | 6.82 | |
| 20 | 10.570 | 4.08 | 1.58144 | 40.8 | 6.74 | |
| 21 | −4.614 | 0.60 | 1.80610 | 33.3 | 6.06 | |
| 22 | 69.938 | (Variable) | | | 6.05 | |
| 23 | −17.595 | 0.70 | 1.77250 | 49.6 | 7.67 | |
| 24 | 46.227 | (Variable) | | | 8.03 | |
| 25* | 10.257 | 3.89 | 1.48749 | 70.2 | 11.13 | |
| 26 | −13.610 | (Variable) | | | 11.23 | |
| 27 | ∞ | 0.80 | 1.51633 | 64.1 | 20.00 | |

-continued

| Unit: mm | | | |
|---|---|---|---|
| 28 | ∞ | | 20.00 |
| Image Plane | ∞ | | |

Aspheric Surface Data

Seventh Surface

| K = 2.79987e−001 | A4 = −5.35367e−005 | A6 = −4.45027e−006 |
|---|---|---|
| A8 = 1.59055e−008 | A10 = 1.04575e−009 | |

Fifteenth Surface

| K = −1.05117e−001 | A4 = 6.36084e−006 | A6 = −8.64819e−007 |
|---|---|---|
| A8 = 2.26861e−008 | | |

Sixteenth Surface

| K = −1.79154e+002 | A4 = 1.43988e−004 |
|---|---|

Twenty-fifth Surface

| K = 0.00000e+000 | A4 = −2.86643e−004 | A6 = 5.74087e−007 |
|---|---|---|
| A8 = −2.33846e−008 | | |

Various Data
Zoom Ratio 15.03

| | Wide Angle | Middle | Telephoto |
|---|---|---|---|
| Focal Length | 5.18 | 25.00 | 77.84 |
| F-number | 3.07 | 4.33 | 5.72 |
| Half Angle of View | 33.59 | 7.83 | 2.53 |
| Image Height | 3.44 | 3.44 | 3.44 |
| Total Lens Length | 80.30 | 83.31 | 88.34 |
| BF | 1.84 | 1.84 | 1.84 |
| d5 | 0.50 | 11.63 | 17.50 |
| d11 | 9.71 | 1.54 | 0.80 |
| d14 | 16.47 | 6.55 | 4.30 |
| d22 | 1.79 | 11.71 | 13.97 |
| d24 | 7.29 | 2.43 | 8.71 |
| d26 | 3.98 | 8.90 | 2.51 |
| Entrance Pupil Position | 18.09 | 63.98 | 164.63 |
| Exit Pupil Position | 252.96 | −261.06 | 33.94 |
| Front Principal Point Position | 23.38 | 86.61 | 431.14 |
| Front Principal Point Position | −3.34 | −23.16 | −76.01 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 32.16 | 9.38 | 2.30 | −3.59 |
| 2 | 6 | −6.16 | 7.16 | 1.31 | −3.84 |
| 3 | 12 | −90.61 | 5.10 | −0.79 | −5.70 |
| 4 | 15 | 13.48 | 11.68 | −4.04 | −9.41 |
| 5 | 23 | −16.42 | 0.70 | 0.11 | −0.28 |
| 6 | 25 | 12.67 | 3.89 | 1.19 | −1.57 |
| GB | 27 | ∞ | 0.80 | 0.26 | −0.26 |

Single-lens Data

| Lens | Starting Surface | Focal Length |
|---|---|---|
| 1 | 1 | −59.11 |
| 2 | 2 | 45.68 |
| 3 | 4 | 36.19 |
| 4 | 6 | −9.17 |
| 5 | 8 | −7.35 |
| 6 | 10 | 10.88 |
| 7 | 12 | −90.61 |
| 8 | 15 | 12.38 |
| 9 | 18 | −32.71 |
| 10 | 20 | 6.13 |
| 11 | 21 | −5.35 |

-continued

| Unit: mm | | |
|---|---|---|
| 12 | 23 | −16.42 |
| 13 | 25 | 12.67 |
| 14 | 27 | 0.00 |

Numerical Example 3

| Unit: mm | | | | | | |
|---|---|---|---|---|---|---|
| Surface Data | | | | | | |
| Surface Number | r | d | nd | vd | Effective Diameter | Outer Diameter |
| 1 | 34.092 | 1.10 | 1.84666 | 23.8 | 26.50 | 27.50 |
| 2 | 19.352 | 4.94 | 1.49700 | 81.5 | 23.60 | |
| 3 | 245.625 | 0.10 | | | 22.28 | |
| 4 | 21.016 | 3.15 | 1.77250 | 49.6 | 21.39 | |
| 5 | 103.274 | (Variable) | | | 20.94 | |
| 6 | 86.233 | 1.05 | 1.84954 | 40.1 | 13.35 | |
| 7* | 6.606 | 3.12 | | | 9.44 | |
| 8 | −15.055 | 0.60 | 2.00000 | 40.0 | 9.19 | |
| 9 | 12.951 | 0.10 | | | 9.19 | |
| 10 | 12.063 | 2.16 | 1.94595 | 18.0 | 9.38 | |
| 11 | −35.833 | (Variable) | | | 9.36 | |
| 12 | ∞ | 4.96 | | | 11.31 | |
| 13 | −15.308 | 0.60 | 1.51633 | 64.1 | 7.42 | |
| 14 | −41.341 | (Variable) | | | 7.49 | |
| 15* | 7.569 | 2.96 | 1.55332 | 71.7 | 8.11 | |
| 16* | −24.486 | 1.00 | | | 7.63 | |
| 17(Stop) | ∞ | 1.00 | | | 6.80 | |
| 18 | 10.632 | 0.60 | 1.84666 | 23.8 | 6.59 | |
| 19 | 5.868 | 1.41 | | | 6.23 | |
| 20 | 9.638 | 3.56 | 1.60342 | 38.0 | 6.83 | |
| 21 | −9.408 | 0.60 | 1.80610 | 33.3 | 6.54 | |
| 22 | 715.065 | (Variable) | | | 6.55 | |
| 23 | −30.828 | 0.70 | 1.77250 | 49.6 | 7.48 | |
| 24 | 19.534 | (Variable) | | | 7.68 | |
| 25* | 10.933 | 3.46 | 1.48749 | 70.2 | 11.39 | |
| 26 | −16.828 | (Variable) | | | 11.34 | |
| 27 | ∞ | 0.80 | 1.51633 | 64.1 | 20.00 | |
| 28 | ∞ | | | | 20.00 | |
| Image Plane | ∞ | | | | | |

Aspheric Surface Data

Seventh Surface

K = 4.95519e−001    A4 = −1.74245e−004    A6 = −9.87660e−006
A8 = 2.61017e−007   A10 = −1.56231e−008

Fifteenth Surface

K = −4.55464e−001   A4 = −1.03451e−004    A6 = −5.23921e−007
A8 = −2.56549e−009

Sixteenth Surface

K = −1.42480e−001   A4 = 1.02387e−004

Twenty-fifth Surface

K = 0.00000e+000    A4 = −1.56104e−004    A6 = 1.29154e−007
A8 = −8.67868e−009

| Various Data Zoom Ratio 15.10 | | | |
|---|---|---|---|
| | Wide Angle | Middle | Telephoto |
| Focal Length | 5.18 | 22.00 | 78.22 |
| F-number | 3.07 | 4.84 | 6.46 |
| Half Angle of View | 33.59 | 8.89 | 2.52 |
| Image Height | 3.44 | 3.44 | 3.44 |

-continued

| Unit: mm | | | |
|---|---|---|---|
| Total Lens Length | 73.49 | 81.72 | 88.34 |
| BF | 2.40 | 2.40 | 2.40 |
| d5 | 0.50 | 9.20 | 15.87 |
| d11 | 5.28 | 4.80 | 4.80 |
| d14 | 13.95 | 2.68 | 0.30 |
| d22 | 0.85 | 12.10 | 14.49 |
| d24 | 6.72 | 3.77 | 10.57 |
| d26 | 5.84 | 8.81 | 1.94 |
| Entrance Pupil Position | 17.37 | 49.95 | 154.44 |
| Exit Pupil Position | −96.21 | −174.21 | 42.84 |
| Front Principal Point Position | 22.28 | 69.21 | 383.94 |
| Front Principal Point Position | −2.78 | −19.60 | −75.82 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 29.61 | 9.29 | 2.60 | −3.27 |
| 2 | 6 | −6.25 | 7.03 | 0.99 | −4.28 |
| 3 | 12 | −47.45 | 5.56 | 4.72 | −0.63 |
| 4 | 15 | 12.16 | 11.12 | −0.59 | −8.24 |
| 5 | 23 | −15.39 | 0.70 | 0.24 | −0.15 |
| 6 | 25 | 14.17 | 3.46 | 0.95 | −1.47 |
| GB | 27 | ∞ | 0.80 | 0.26 | −0.26 |

Single-lens Data

| Lens | Starting Surface | Focal Length |
|---|---|---|
| 1 | 1 | −54.74 |
| 2 | 2 | 41.96 |
| 3 | 4 | 33.59 |
| 4 | 6 | −8.47 |
| 5 | 8 | −6.89 |
| 6 | 10 | 9.75 |
| 7 | 13 | −47.45 |
| 8 | 15 | 10.80 |
| 9 | 18 | −16.42 |
| 10 | 20 | 8.49 |
| 11 | 21 | −11.52 |
| 12 | 23 | −15.39 |
| 13 | 25 | 14.17 |
| 14 | 27 | 0.00 |

Numerical Example 4

| Unit: mm | | | | | | |
|---|---|---|---|---|---|---|
| Surface Data | | | | | | |
| Surface Number | r | d | nd | vd | Effective Diameter | Outer Diameter |
| 1 | 60.269 | 1.10 | 1.84666 | 23.8 | 27.53 | 28.50 |
| 2 | 26.489 | 5.05 | 1.49700 | 81.5 | 26.22 | |
| 3 | −76.755 | 0.10 | | | 26.09 | |
| 4 | 21.031 | 3.33 | 1.77250 | 49.6 | 23.09 | |
| 5 | 75.809 | (Variable) | | | 22.45 | |
| 6* | −46.672 | 1.05 | 1.85135 | 40.1 | 12.32 | |
| 7* | 13.268 | 2.42 | | | 8.86 | |
| 8 | −8.325 | 0.60 | 1.88300 | 40.8 | 8.24 | |
| 9 | 8.584 | 0.10 | | | 8.11 | |
| 10 | 9.151 | 1.90 | 1.94595 | 18.0 | 8.16 | |

-continued

Unit: mm

| | | | | | |
|---|---|---|---|---|---|
| 11 | −84.808 | (Variable) | | | 8.13 |
| 12 | ∞ | (Variable) | | | 11.31 |
| 13* | 6.467 | 4.00 | 1.51633 | 64.1 | 7.27 |
| 14* | −21.838 | 1.00 | | | 6.41 |
| 15(Stop) | ∞ | 1.00 | | | 5.67 |
| 16 | 89.305 | 0.60 | 1.85026 | 32.3 | 5.56 |
| 17 | 6.084 | 1.09 | | | 5.43 |
| 18 | 7.546 | 3.64 | 1.51742 | 52.4 | 6.30 |
| 19 | −7.668 | 0.60 | 1.88300 | 40.8 | 6.56 |
| 20* | −22.132 | (Variable) | | | 6.86 |
| 21* | 19.312 | 2.83 | 1.48749 | 70.2 | 10.24 |
| 22 | −43.947 | (Variable) | | | 10.10 |
| 23 | ∞ | 0.80 | 1.51633 | 64.1 | 20.00 |
| 24 | ∞ | | | | 20.00 |
| Image Plane | ∞ | | | | |

Aspheric Surface Data

Sixth Surface

K = 0.00000e+000   A4 = 2.27484e−004   A6 = 1.69367e−005
A8 = −3.96934e−007  A10 = 3.67104e−009

Seventh Surface

K = −1.79858e+000  A4 = 1.66303e−004   A6 = 2.60989e−005
A8 = 3.77154e−008   A10 = 1.84548e−008

Thirteenth Surface

K = −5.56364e−001  A4 = −5.59307e−005  A6 = 6.34812e−007
A8 = −1.11004e−008

Fourteenth Surface

K = 0.00000e+000   A4 = 1.38992e−004

Twentieth Surface

K = −4.82233e+000  A4 = 3.65336e−005   A6 = 7.10381e−006
A8 = −3.92807e−007  A10 = 1.65954e−008

Twenty-first Surface

K = 0.00000e+000   A4 = 6.02068e−005   A6 = −1.64175e−006
A8 = 3.06501e−008

Various Data
Zoom Ratio 15.67

| | Wide Angle | Middle | Telephoto |
|---|---|---|---|
| Focal Length | 5.73 | 22.00 | 89.77 |
| F-number | 3.50 | 4.59 | 5.49 |
| Half Angle of View | 31.43 | 9.04 | 2.23 |
| Image Height | 3.50 | 3.50 | 3.50 |
| Total Lens Length | 71.65 | 80.06 | 86.60 |
| BF | 4.89 | 4.89 | 4.89 |
| d5 | 0.50 | 10.50 | 17.50 |
| d11 | 6.75 | 5.10 | 4.80 |
| d12 | 17.21 | 6.55 | 4.30 |
| d20 | 5.79 | 6.60 | 23.79 |
| d22 | 5.29 | 15.21 | 0.10 |
| d24 | 4.89 | 4.89 | 4.89 |
| Entrance Pupil Position | 16.81 | 57.16 | 230.25 |
| Exit Pupil Position | −27.17 | −39.61 | 477.85 |
| Front Principal Point Position | 21.51 | 68.29 | 337.06 |
| Front Principal Point Position | −0.83 | −17.11 | −84.88 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 29.06 | 9.58 | 3.22 | −2.74 |
| 2 | 6 | −5.25 | 6.08 | 1.51 | −2.71 |

-continued

| Unit: mm | | | | | |
|---|---|---|---|---|---|
| 3 | 13 | 16.98 | 11.93 | −2.90 | −10.75 |
| 4 | 21 | 27.93 | 2.83 | 0.59 | −1.34 |
| GB | 23 | ∞ | 0.80 | 0.26 | −0.26 |

Single-lens Data

| Lens | Starting Surface | Focal Length |
|---|---|---|
| 1 | 1 | −56.67 |
| 2 | 2 | 40.28 |
| 3 | 4 | 36.70 |
| 4 | 6 | −12.04 |
| 5 | 8 | −4.71 |
| 6 | 10 | 8.82 |
| 7 | 13 | 10.15 |
| 8 | 16 | −7.70 |
| 9 | 18 | 8.00 |
| 10 | 19 | −13.55 |
| 11 | 21 | 27.93 |
| 12 | 23 | 0.00 |

Numerical Example 5

| Unit: mm | | | | | | |
|---|---|---|---|---|---|---|
| Surface Data | | | | | | |
| Surface Number | r | d | nd | vd | Effective Diameter | Outer Diameter |
| 1 | 40.115 | 1.10 | 1.84666 | 23.8 | 27.50 | 28.50 |
| 2 | 22.601 | 5.01 | 1.49700 | 81.5 | 24.86 | |
| 3 | −639.469 | (Variable) | | | 24.29 | |
| 4 | 22.411 | 3.31 | 1.77250 | 49.6 | 23.18 | |
| 5 | 96.137 | (Variable) | | | 22.69 | |
| 6 | 121.669 | 1.05 | 1.84954 | 40.1 | 13.43 | |
| 7* | 8.387 | 3.09 | | | 10.13 | |
| 8 | −13.033 | 0.60 | 1.88300 | 40.8 | 9.44 | |
| 9 | 8.611 | 0.10 | | | 9.08 | |
| 10 | 9.163 | 2.11 | 1.94595 | 18.0 | 9.09 | |
| 11 | 293.593 | 4.80 | | | 9.00 | |
| 12 | ∞ | (Variable) | | | 11.31 | |
| 13* | 7.266 | 3.67 | 1.55332 | 71.7 | 8.20 | |
| 14* | −530.318 | 1.00 | | | 7.18 | |
| 15(Stop) | ∞ | 1.00 | | | 6.53 | |
| 16 | 9.580 | 0.60 | 1.84666 | 23.8 | 6.37 | |
| 17 | 5.742 | 1.45 | | | 6.03 | |
| 18 | 10.456 | 3.47 | 1.56732 | 42.8 | 6.45 | |
| 19 | −9.352 | 0.60 | 1.80610 | 33.3 | 6.47 | |
| 20 | −35.445 | (Variable) | | | 6.58 | |
| 21 | −15.120 | 0.70 | 1.77250 | 49.6 | 6.99 | |
| 22 | 118.961 | (Variable) | | | 7.26 | |
| 23* | 12.808 | 3.49 | 1.48749 | 70.2 | 11.80 | |
| 24 | −18.982 | (Variable) | | | 11.77 | |
| 25 | ∞ | 0.80 | 1.51633 | 64.1 | 20.00 | |
| 26 | ∞ | | | | 20.00 | |
| Image Plane | ∞ | | | | | |

Aspheric Surface Data

Seventh Surface

K = 2.50717e−002   A4 = −1.20472e−006   A6 = −6.57466e−006
A8 = 3.87504e−007   A10 = −9.80177e−009

Thirteenth Surface

K = −3.62944e−001   A4 = −9.47829e−005   A6 = −1.02524e−006
A8 = −1.04732e−008

-continued

Unit: mm

Fourteenth Surface

K = 0.00000e+000    A4 = −9.61549e−007

Twenty-third Surface

K = 0.00000e+000    A4 = −9.18726e−005    A6 = 4.92067e−007
A8 = −1.16408e−008

Various Data
Zoom Ratio 16.00

|  | Wide Angle | Middle | Telephoto |
|---|---|---|---|
| Focal Length | 5.41 | 23.69 | 86.55 |
| F-number | 3.07 | 4.43 | 5.75 |
| Half Angle of View | 32.53 | 8.29 | 2.28 |
| Image Height | 3.45 | 3.45 | 3.45 |
| Total Lens Length | 71.52 | 82.05 | 88.34 |
| BF | 2.22 | 2.22 | 2.22 |
| d3 | 0.45 | 0.80 | 0.91 |
| d5 | 0.60 | 10.84 | 17.14 |
| d12 | 21.31 | 7.45 | 4.30 |
| d20 | 5.69 | 8.24 | 6.56 |
| d22 | 1.00 | 5.97 | 17.13 |
| d24 | 2.30 | 8.58 | 2.13 |
| Entrance Pupil Position | 18.78 | 63.41 | 196.24 |
| Exit Pupil Position | −25.37 | −204.08 | 40.49 |
| Front Principal Point Position | 23.13 | 84.38 | 478.51 |
| Front Principal Point Position | −3.19 | −21.47 | −84.34 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 151.93 | 6.11 | −0.93 | −4.88 |
| 2 | 4 | 37.10 | 3.31 | −0.56 | −2.39 |
| 3 | 6 | −5.50 | 11.75 | 1.73 | −7.92 |
| 4 | 13 | 13.72 | 11.79 | 0.67 | −8.62 |
| 5 | 21 | −17.33 | 0.70 | 0.04 | −0.35 |
| 6 | 23 | 16.27 | 3.49 | 0.98 | −1.45 |
| GB | 25 | ∞ | 0.80 | 0.26 | −0.26 |

Single-lens Data

| Lens | Starting Surface | Focal Length |
|---|---|---|
| 1 | 1 | −62.96 |
| 2 | 2 | 44.03 |
| 3 | 4 | 37.10 |
| 4 | 6 | −10.65 |
| 5 | 8 | −5.80 |
| 6 | 10 | 9.96 |
| 7 | 13 | 12.99 |
| 8 | 16 | −18.24 |
| 9 | 18 | 9.29 |
| 10 | 19 | −15.92 |
| 11 | 21 | −17.33 |
| 12 | 23 | 16.27 |
| 13 | 25 | 0.00 |

TABLE 1

| | Condition | | | | | |
|---|---|---|---|---|---|---|
| | (1) | (2) | (3) | (4) | (5) | (6) |
| Numerical Example 1 | 0.98 | 12.2 | 1.32 | 0.22 | 1.87 | 1.67 |
| Numerical Example 2 | 0.70 | 12.6 | 1.46 | 0.16 | 1.87 | 2.19 |
| Numerical Example 3 | 0.90 | 12.5 | 1.39 | 0.18 | 1.92 | 2.21 |
| Numerical Example 4 | 0.63 | 17.1 | 1.49 | 0.31 | 1.87 | 5.47 |
| Numerical Example 5 | 0.83 | 15.7 | 1.47 | 0.19 | 1.87 | 2.92 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-003023 filed Jan. 11, 2012, which is hereby incorporated by reference herein in its entirety.

What is claimed is:

1. A zoom lens comprising, in order from an object side to an image side:
    a front lens group including a first lens unit having positive refractive power and a second lens unit having positive or negative refractive power;
    a reflecting mirror configured to bend an optical path; and
    a rear lens group including two or more lens units,
    wherein, during zooming, the reflecting mirror is stationary, and the first lens unit and at least two lens units included in the rear lens group move,
    wherein, when the zoom lens is retracted, the reflecting mirror performs at least one operation of a rotation around a rotational shaft and a movement in a direction of an optical axis of the rear lens group, and at least part of the front lens group is stored in a space formed by the operation of the reflecting mirror, and
    wherein the following conditions are satisfied:

$0.50 < |(Mmax - Mmin)|/(D - Lp/\sqrt{2}) < 1.00$ $10.5 < ft/|fn| < 30.0$ where fn is a focal length of a lens unit having the highest absolute value of refractive power among lens units having negative refractive power included in the front lens group, ft is a focal length of the entire zoom lens at a telephoto end, Mmax and Mmin are respectively a maximum value and a minimum value of amounts of movement of the at least two lens units included in the rear lens group during zooming from a wide-angle end to the telephoto end, Lp is a length of a reflecting surface of the reflecting mirror in a cross section including an optical axis of the front lens group and an optical axis of the rear lens group, and D is a maximum effective diameter of the first lens unit.

2. The zoom lens according to claim 1, wherein the following condition is satisfied:

$0.50 < Lmax/(Lp/\sqrt{2}) < 2.00$ where Lmax is a maximum value of a lens configuration length of the two or more lens units constituting the rear lens group.

3. The zoom lens according to claim 1, wherein the following condition is satisfied:

$0.10 < fr/ft < 0.40$ where fr is a focal length of a lens unit arranged closest to the image side in the rear lens group.

4. The zoom lens according to claim 1, wherein a lens unit having the largest absolute value of refractive power among lens units having negative refractive power included in the front lens group includes two or more negative lenses, and the following condition is satisfied:

$1.85 < Nn < 2.00$ where Nn is an average of refractive indices of materials of the two or more negative lenses.

5. The zoom lens according to claim 1, wherein a lens unit arranged closest to the object side among the lens units constituting the rear lens group includes a first lens subunit, and a second lens subunit configured to move an imaging position in a direction perpendicular to the optical axis of the rear lens group by moving in a direction having a component of a direction perpendicular to the optical axis.

6. The zoom lens according to claim 1, wherein the following condition is satisfied:

$1.50 < Zf/Zr < 6.00$ where Z f is a variable magnification ratio of the front lens group, and Zr is a variable magnification ratio of the rear lens group.

7. The zoom lens according to claim 1, wherein the reflecting mirror performs both operations of the rotation and the movement in the direction of the optical axis of the rear lens group when the zoom lens is retracted.

8. The zoom lens according to claim 1, wherein the front lens group consists of, in order from the object side to the image side, a first lens unit having positive refractive power and a second lens unit having negative refractive power, and
    wherein the rear lens group consists of, in order from the object side to the image side, a third lens unit having positive refractive power, a fourth lens unit having negative refractive power, and a fifth lens unit having positive refractive power.

9. The zoom lens according to claim 1, wherein the front lens group consists of, in order from the object side to the image side, a first lens unit having positive refractive power, a second lens unit having negative refractive power, a third lens unit having negative refractive power, and
    wherein the rear lens group consists of, in order from the object side to the image side, a fourth lens unit having positive refractive power, a fifth lens unit having negative refractive power, and a sixth lens unit having positive refractive power.

10. The zoom lens according to claim 1, wherein the front lens group consists of, in order from the object side to the image side, a first lens unit having positive refractive power and a second lens unit having negative refractive power, and
    wherein the rear lens group consists of, in order from the object side to the image side, a third lens unit having negative refractive power, a fourth lens unit having positive refractive power, a fifth lens unit having negative refractive power, and a sixth lens unit having positive refractive power.

11. The zoom lens according to claim 1, wherein the front lens group consists of, in order from the object side to the image side, a first lens unit having positive refractive power and a second lens unit having negative refractive power, and
    wherein the rear lens group consists of, in order from the object side to the image side, a third lens unit having positive refractive power and a fourth lens unit having positive refractive power.

12. The zoom lens according to claim 1, wherein the front lens group consists of, in order from the object side to the image side, a first lens unit having positive refractive power, a second lens unit having positive refractive power, and a third lens unit having negative refractive power, and wherein the rear lens group consists of, in order from the object side to the image side, a fourth lens unit having positive refractive power, a fifth lens unit having negative refractive power, and a sixth lens unit having positive refractive power.

13. The zoom lens according to claim 1, wherein, when the zoom lens is retracted, the reflecting mirror is positioned such that a line normal to the reflecting surface of the reflecting mirror becomes substantially parallel to the optical axis of the front lens group.

14. The zoom lens according to claim 1, wherein, when the zoom lens is retracted, the reflecting mirror is positioned such that the reflecting surface of the reflecting mirror becomes substantially parallel to the optical axis of the rear lens group.

15. An image pickup apparatus comprising:
a zoom lens; and
a solid-state image sensor configured to receive an image formed by the zoom lens,
wherein the zoom lens comprises, in order from an object side to an image side:
a front lens group including a first lens unit having positive refractive power and a second lens unit having positive or negative refractive power;
a reflecting mirror configured to bend an optical path; and
a rear lens group including two or more lens units,
wherein, during zooming, the reflecting mirror is stationary, and the first lens unit and at least two lens units included in the rear lens group move,
wherein, when the zoom lens is retracted, the reflecting mirror performs at least one operation of a rotation around a rotational shaft and a movement in a direction parallel to an optical axis of the rear lens group, and at least part of the front lens group is stored in a space formed by the operation of the reflecting mirror, and
wherein the following conditions are satisfied:

$$0.50 < |(M\max - M\min)|/(D - Lp/\sqrt{2}) < 1.00$$

$$10.5 < ft/|fn| < 30.0$$

where fn is a focal length of a lens unit having the highest absolute value of refractive power among lens units having negative refractive power included in the front lens group, ft is a focal length of the entire zoom lens at a telephoto end, Mmax and Mmin are respectively a maximum value and a minimum value of amounts of movement of the at least two lens units included in the rear lens group during zooming from a wide-angle end to the telephoto end, Lp is a length of a reflecting surface of the reflecting mirror in a cross section including an optical axis of the front lens group and an optical axis of the rear lens group, and D is a maximum effective diameter of the first lens unit.

* * * * *